Figure 2:
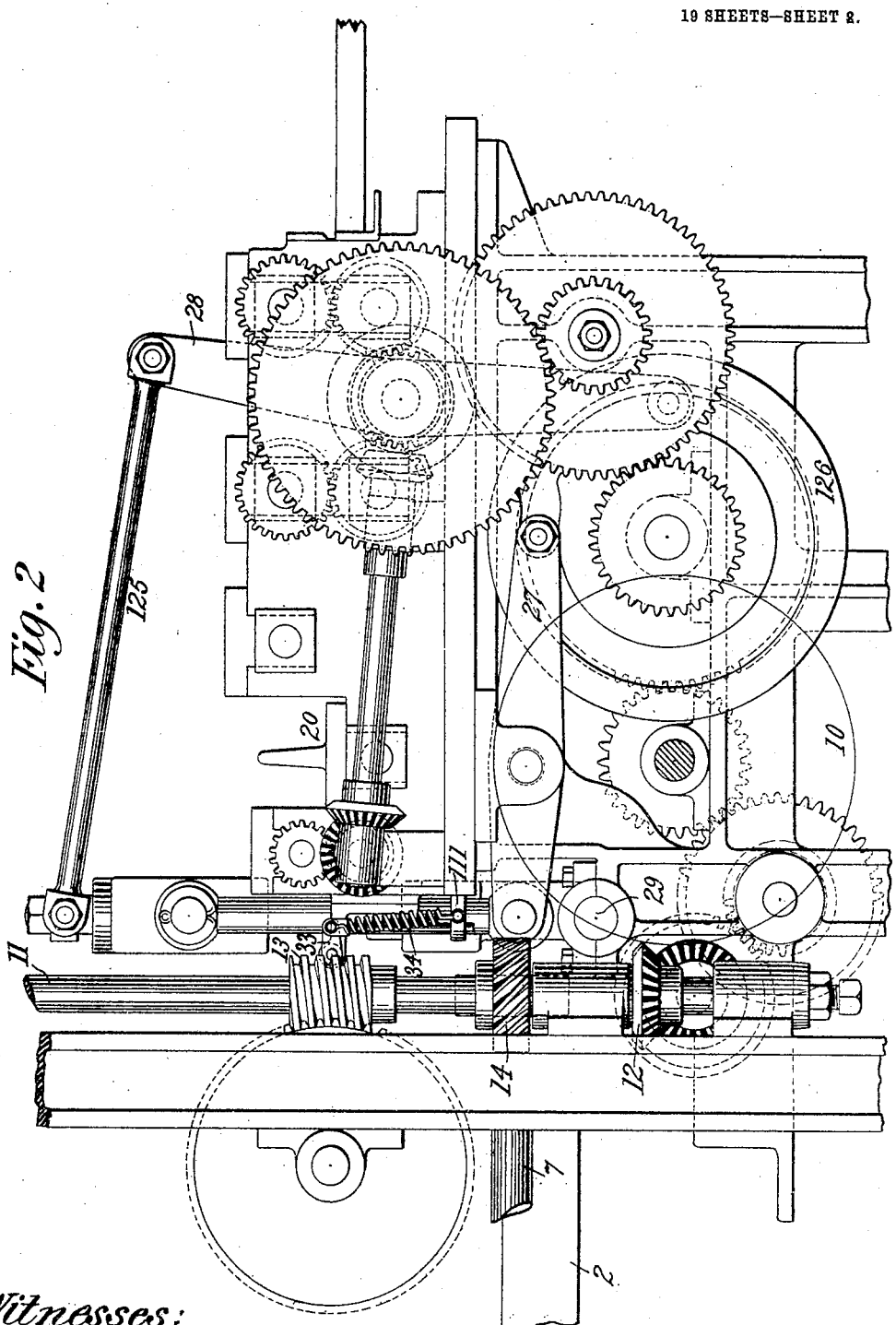

No. 803,538. PATENTED NOV. 7, 1905.
G. A. BARNES.
MACHINE FOR MAKING AND BOXING MATCHES.
APPLICATION FILED AUG. 5, 1899.

19 SHEETS—SHEET 1.

Fig. 1

Witnesses
Raphaël Netter
John C. Kent

George A Barnes Inventor
by Herr, Page Hooper Attys

No. 803,538. PATENTED NOV. 7, 1905.
G. A. BARNES.
MACHINE FOR MAKING AND BOXING MATCHES.
APPLICATION FILED AUG. 5, 1899.

19 SHEETS—SHEET 3.

Witnesses:
Raphaël Netter
John C. Kerr

Inventor
George A. Barnes,
by Kerr, Page & Cooper Att'ys

No. 803,538. PATENTED NOV. 7, 1905.
G. A. BARNES.
MACHINE FOR MAKING AND BOXING MATCHES.
APPLICATION FILED AUG. 5, 1899.

19 SHEETS—SHEET 5.

Witnesses
Raphaël Netter
John C. Kerr

George A. Barnes, Inventor
by Kerr, Page Cooke Attys.

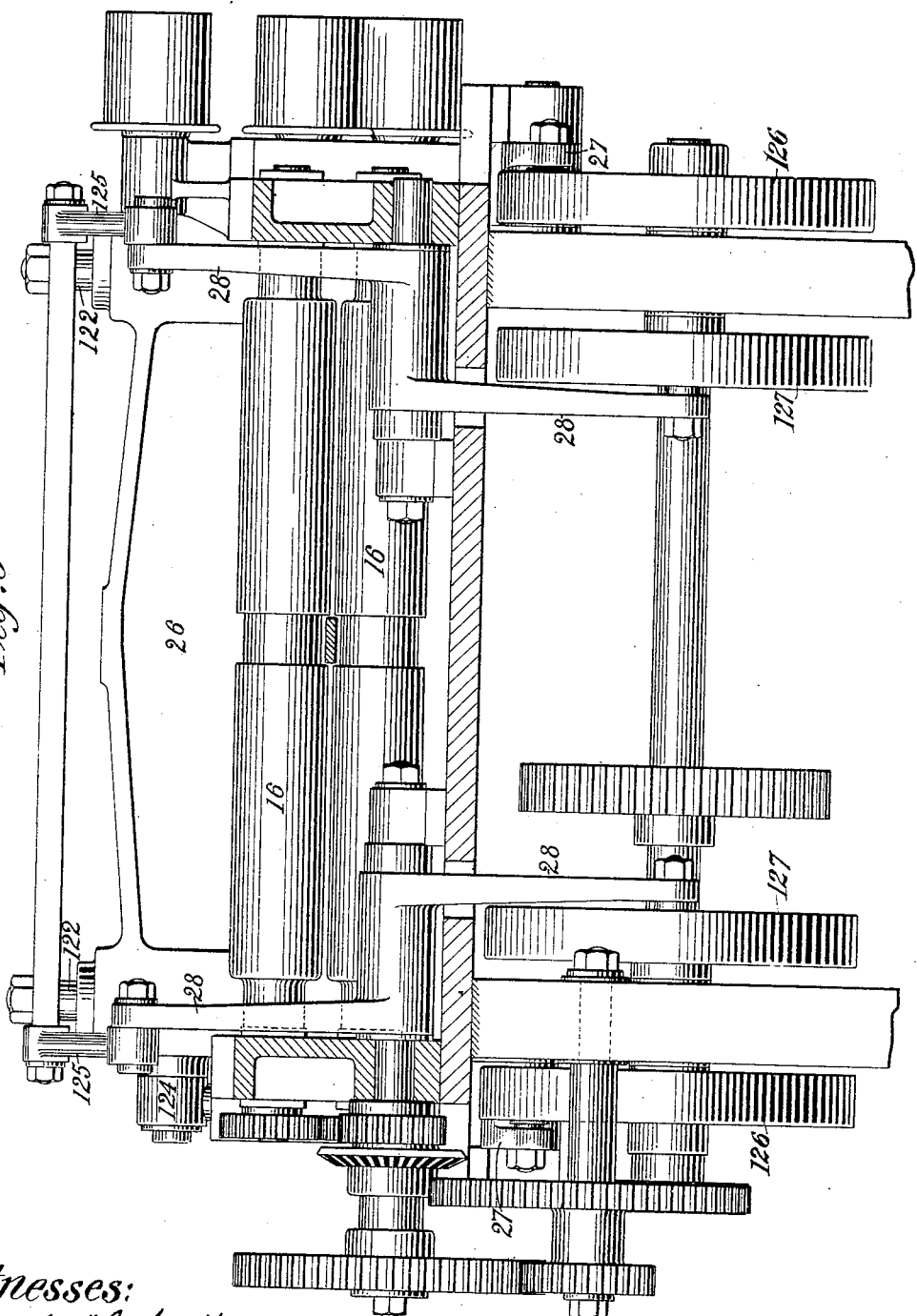

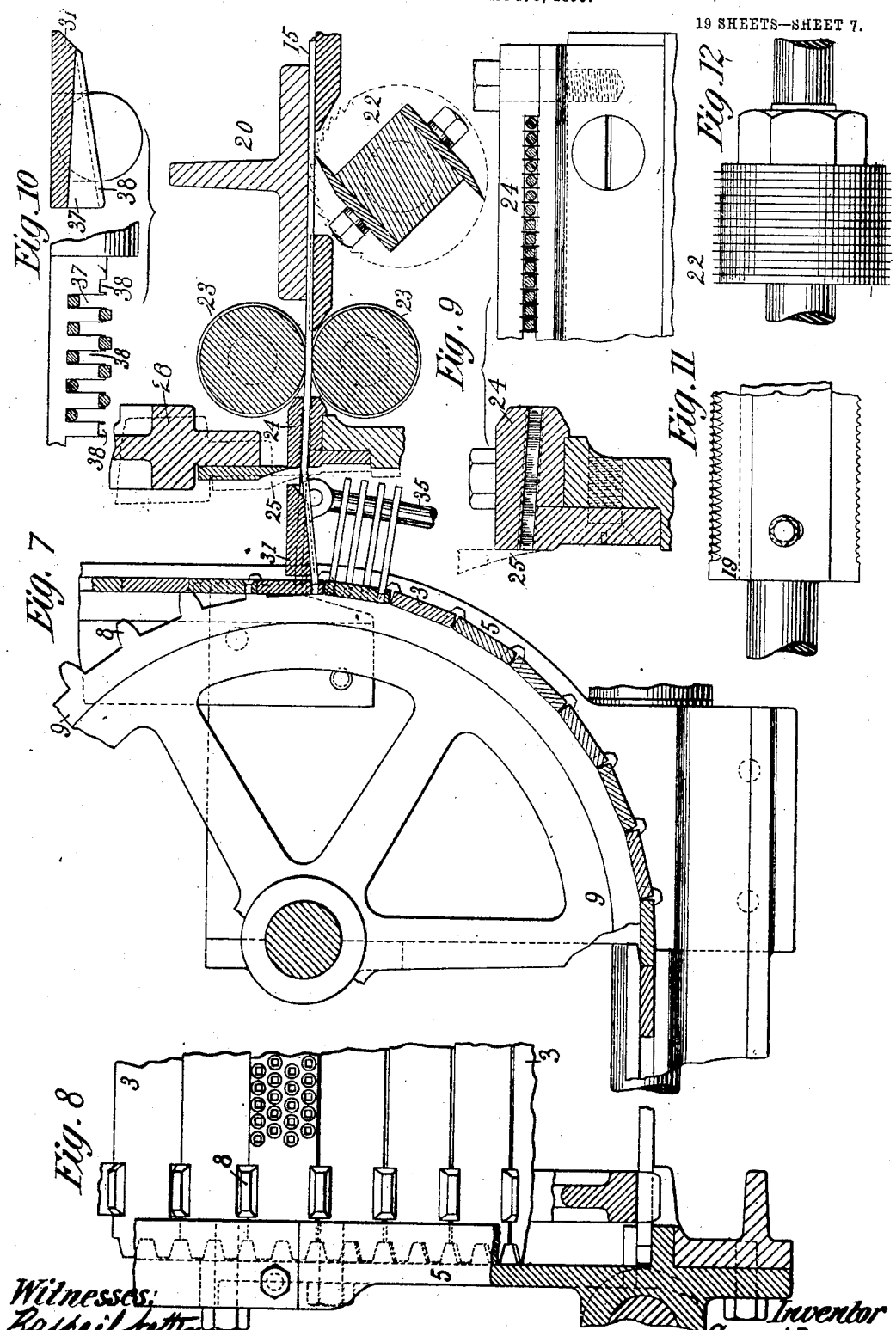

No. 803,538. PATENTED NOV. 7, 1905.
G. A. BARNES.
MACHINE FOR MAKING AND BOXING MATCHES.
APPLICATION FILED AUG. 5, 1899.
19 SHEETS—SHEET 6.

Witnesses:
Raphael Netter
John C. Kerr

George A. Barnes, Inventor
by Kerr, Page & Cooper Attys.

No. 803,538. PATENTED NOV. 7, 1905.
G. A. BARNES.
MACHINE FOR MAKING AND BOXING MATCHES.
APPLICATION FILED AUG. 5, 1899.
19 SHEETS—SHEET 9.
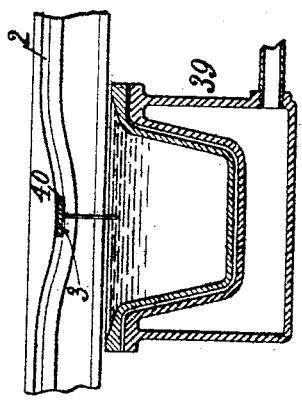
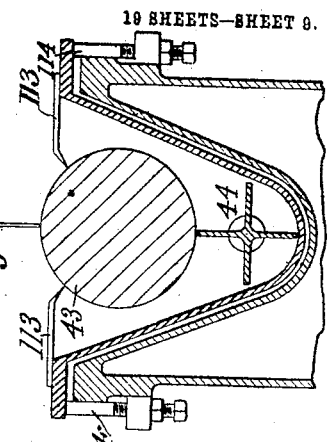
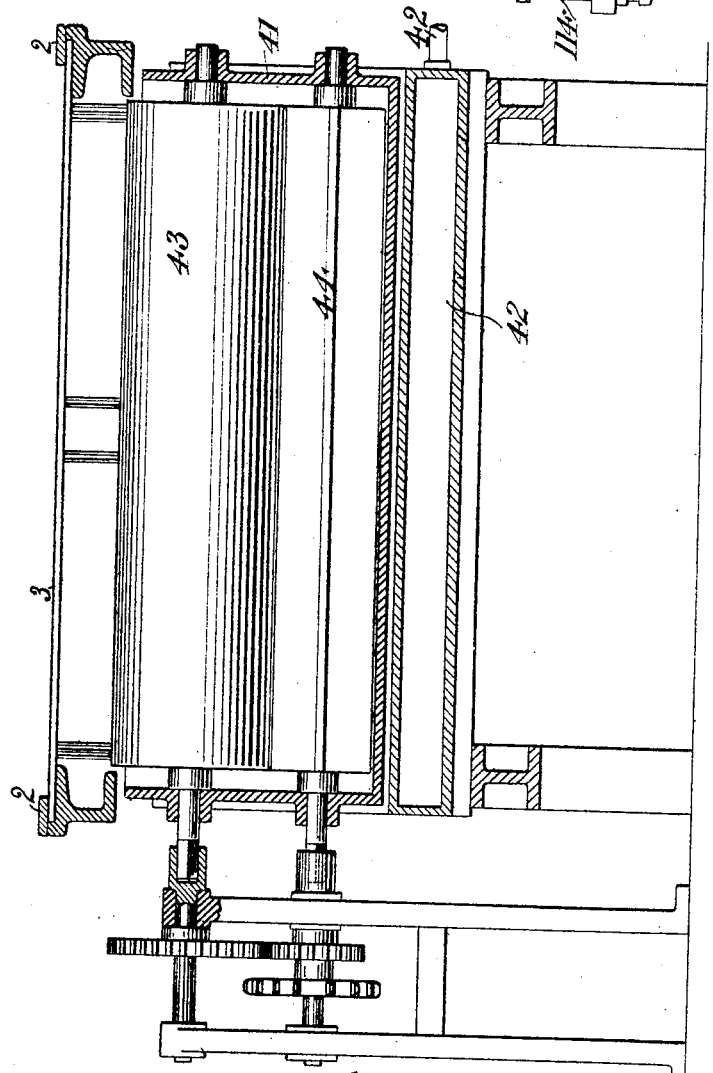
Witnesses:
John C. Ker___
Benjamin Miller
George A. Barnes, Inventor
by Kerr, Page & Cooper, Attys No. 803,538. PATENTED NOV. 7, 1905.
G. A. BARNES.
MACHINE FOR MAKING AND BOXING MATCHES.
APPLICATION FILED AUG. 5, 1899.
19 SHEETS—SHEET 10.
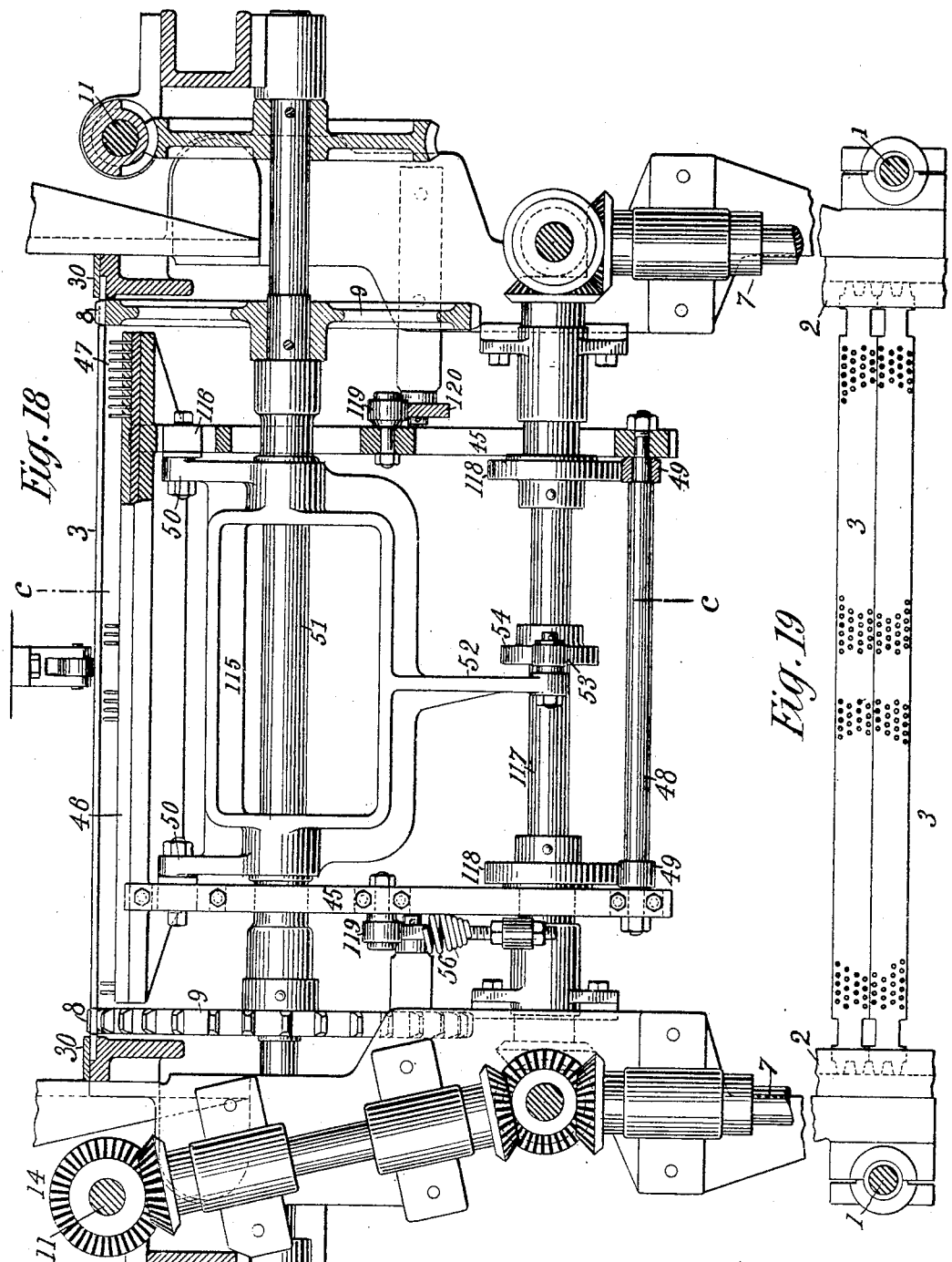
Witnesses:
Raphaël Netter
John C. Kerr
George A. Barnes, Inventor
by Kerr, Page & Cooper Attys

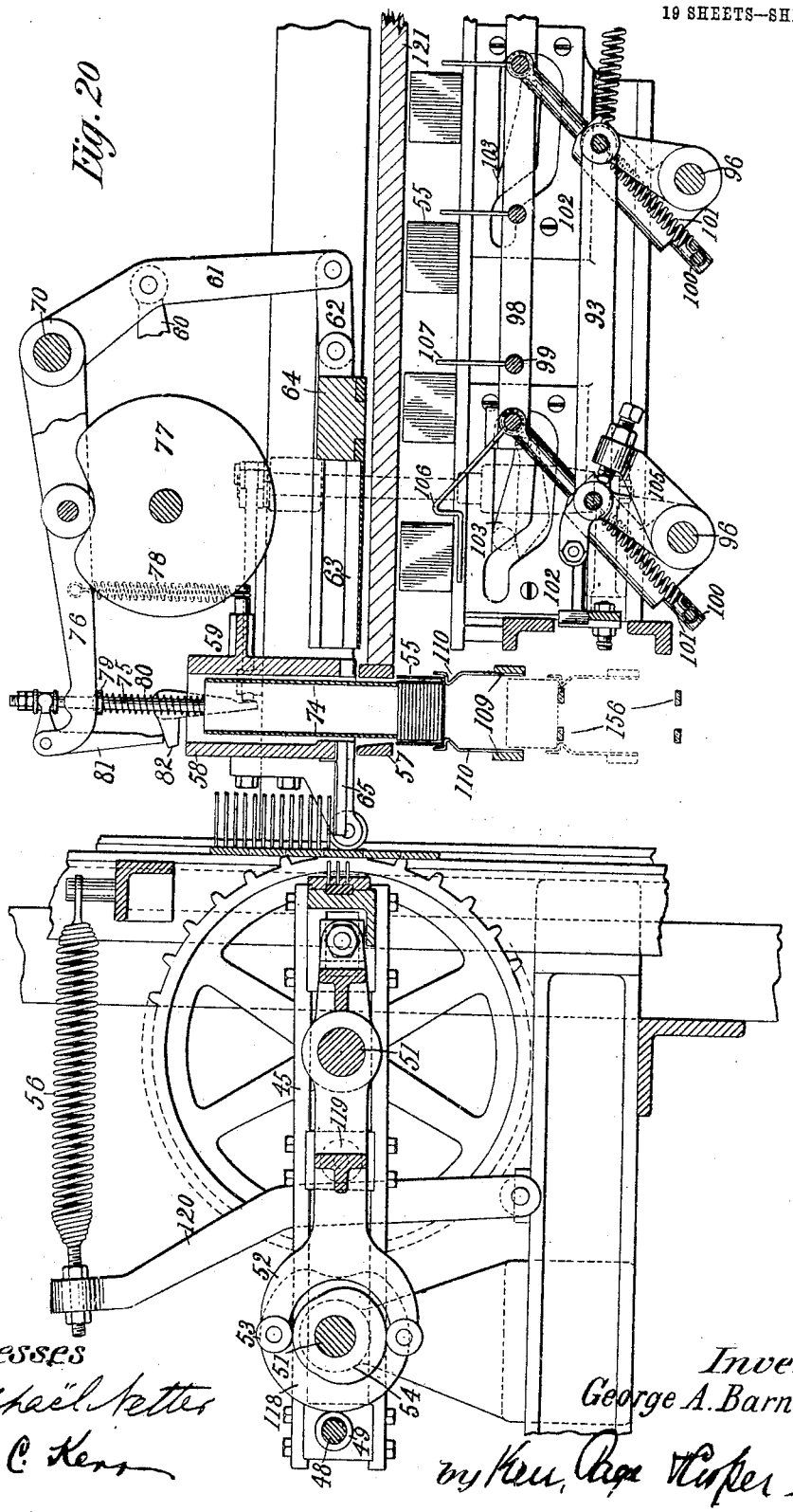

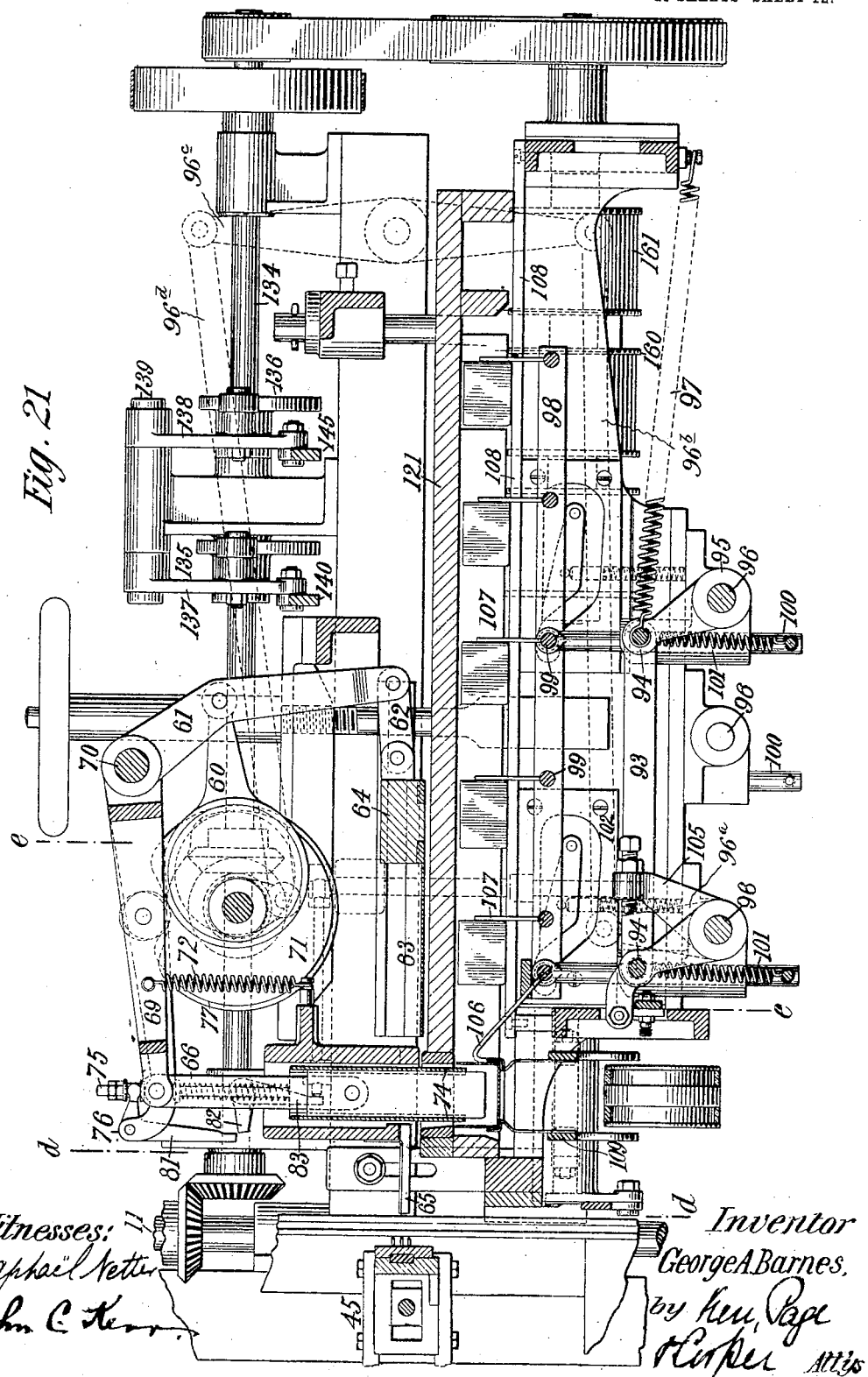

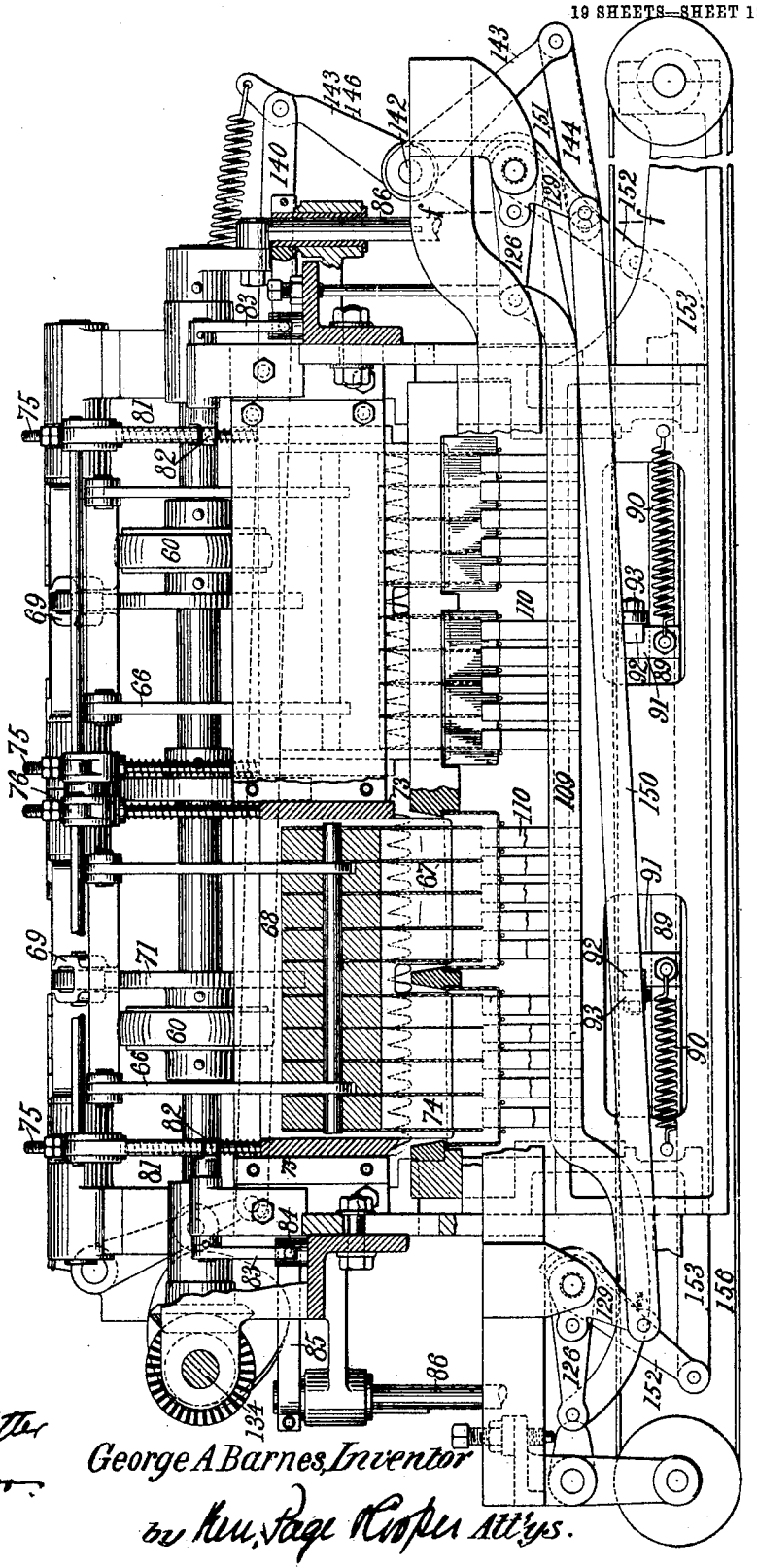

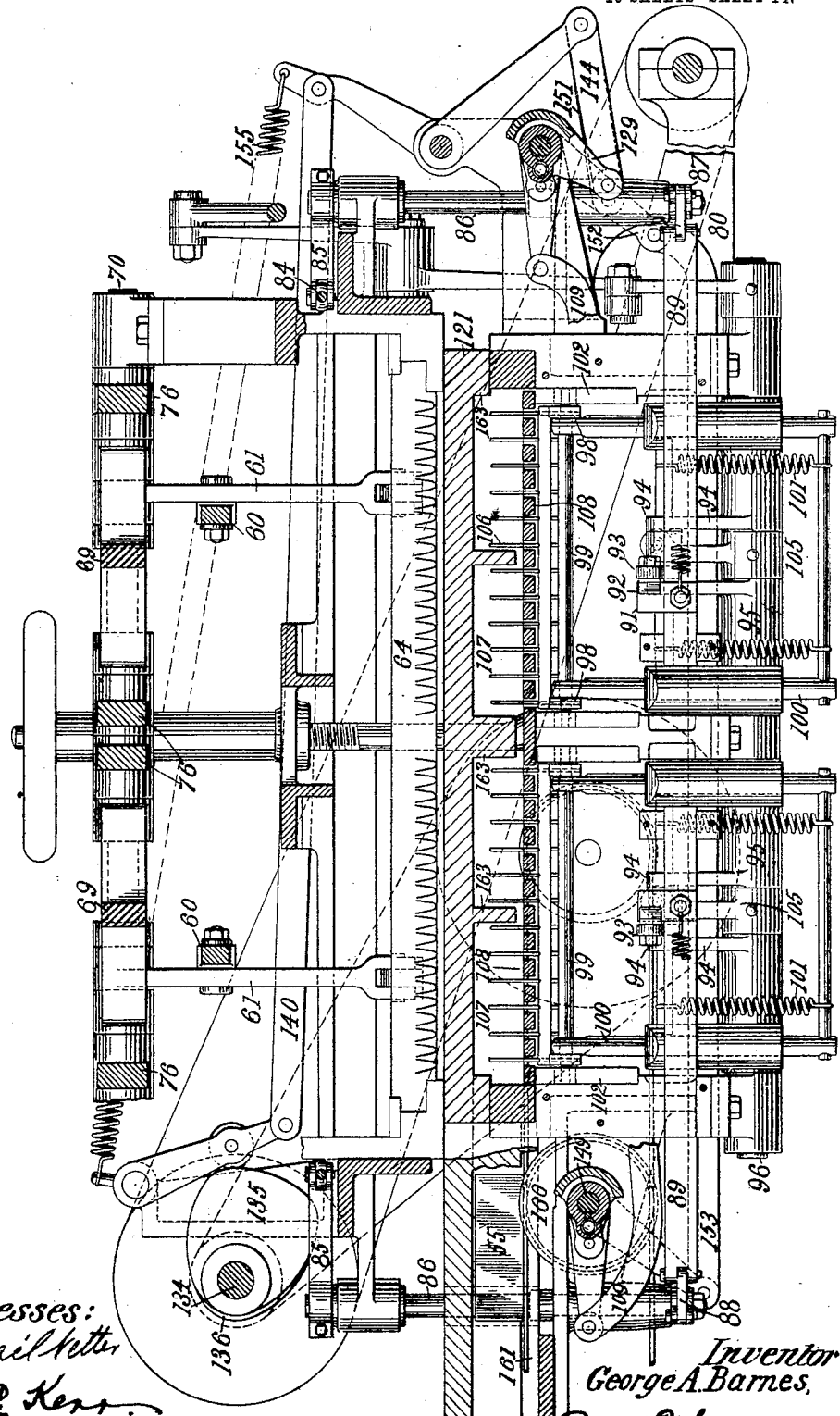

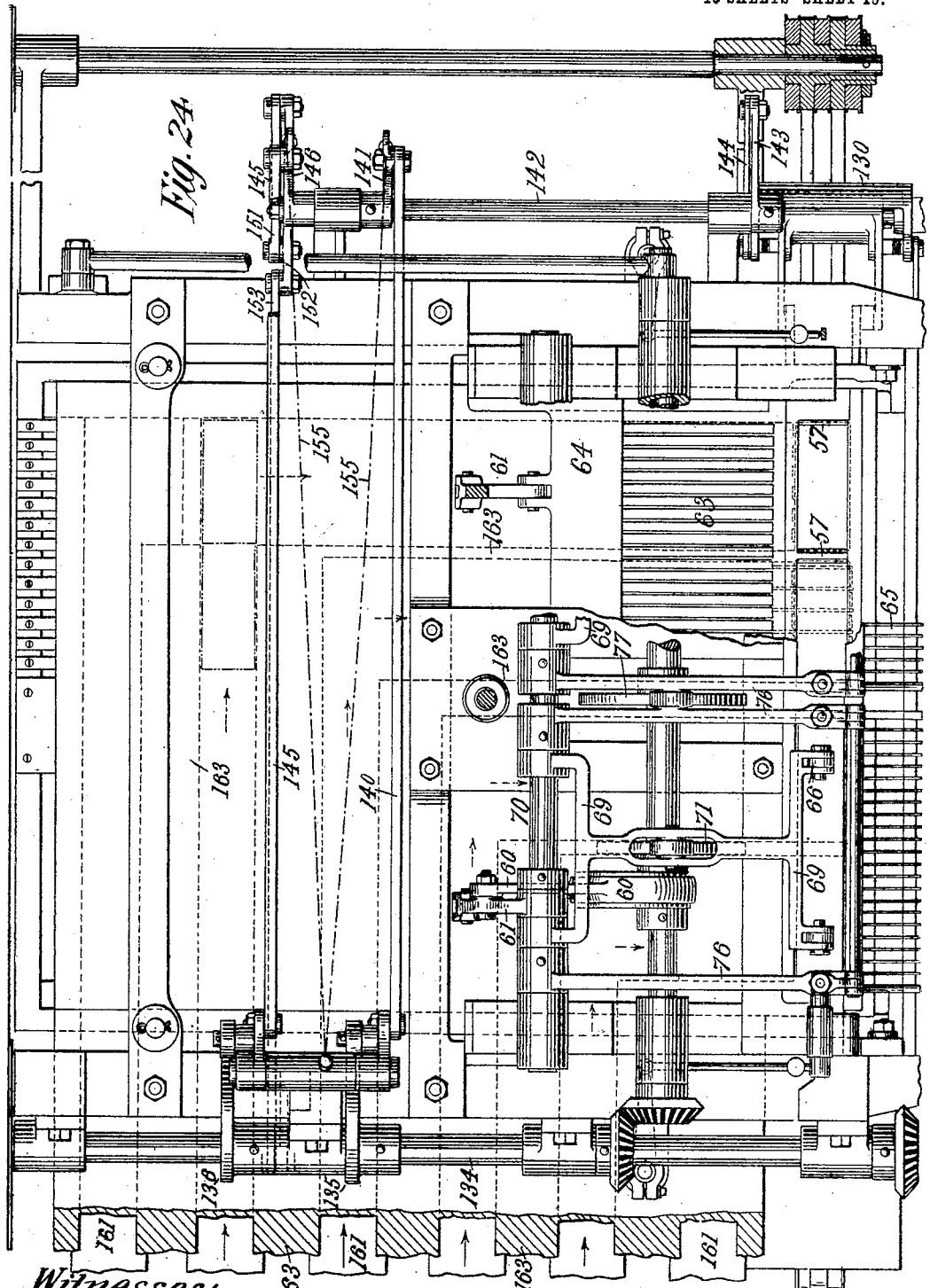

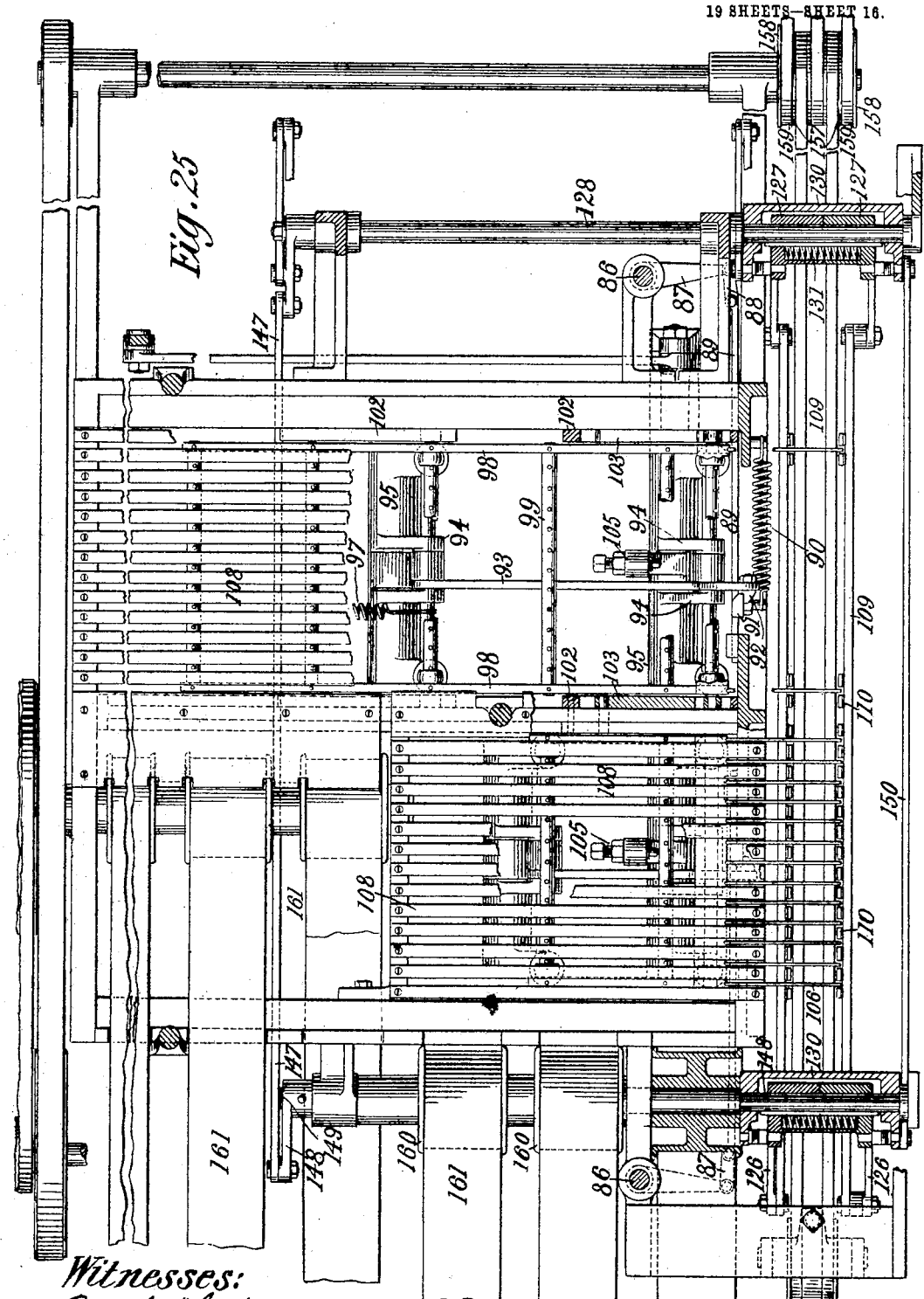

No. 803,538. PATENTED NOV. 7, 1905.
G. A. BARNES.
MACHINE FOR MAKING AND BOXING MATCHES.
APPLICATION FILED AUG. 5, 1899.
19 SHEETS—SHEET 17.
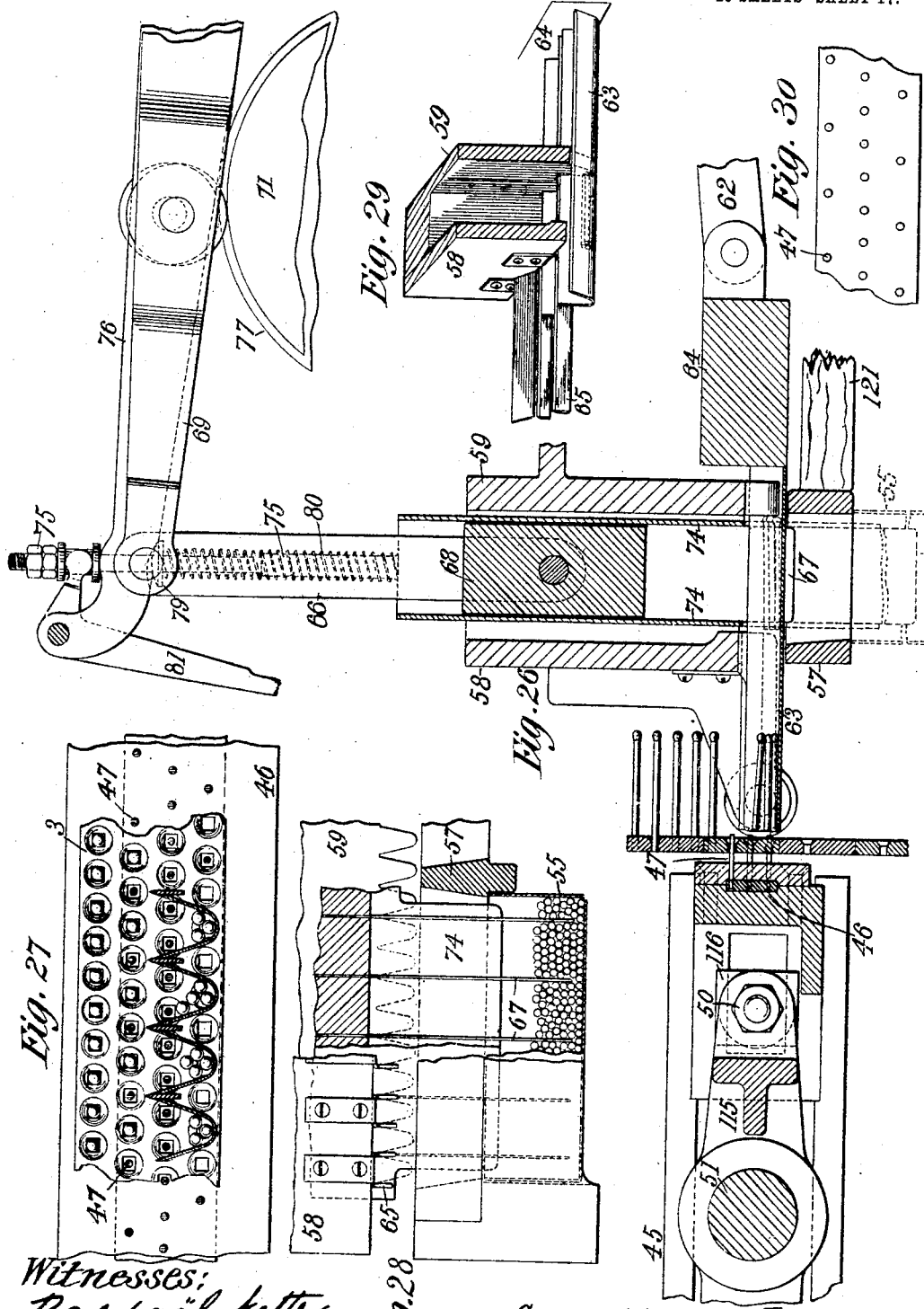
Witnesses:
Raphaël Netter
John C. Kerr
George A. Barnes, Inventor
by Kerr, Page Cooper Attys

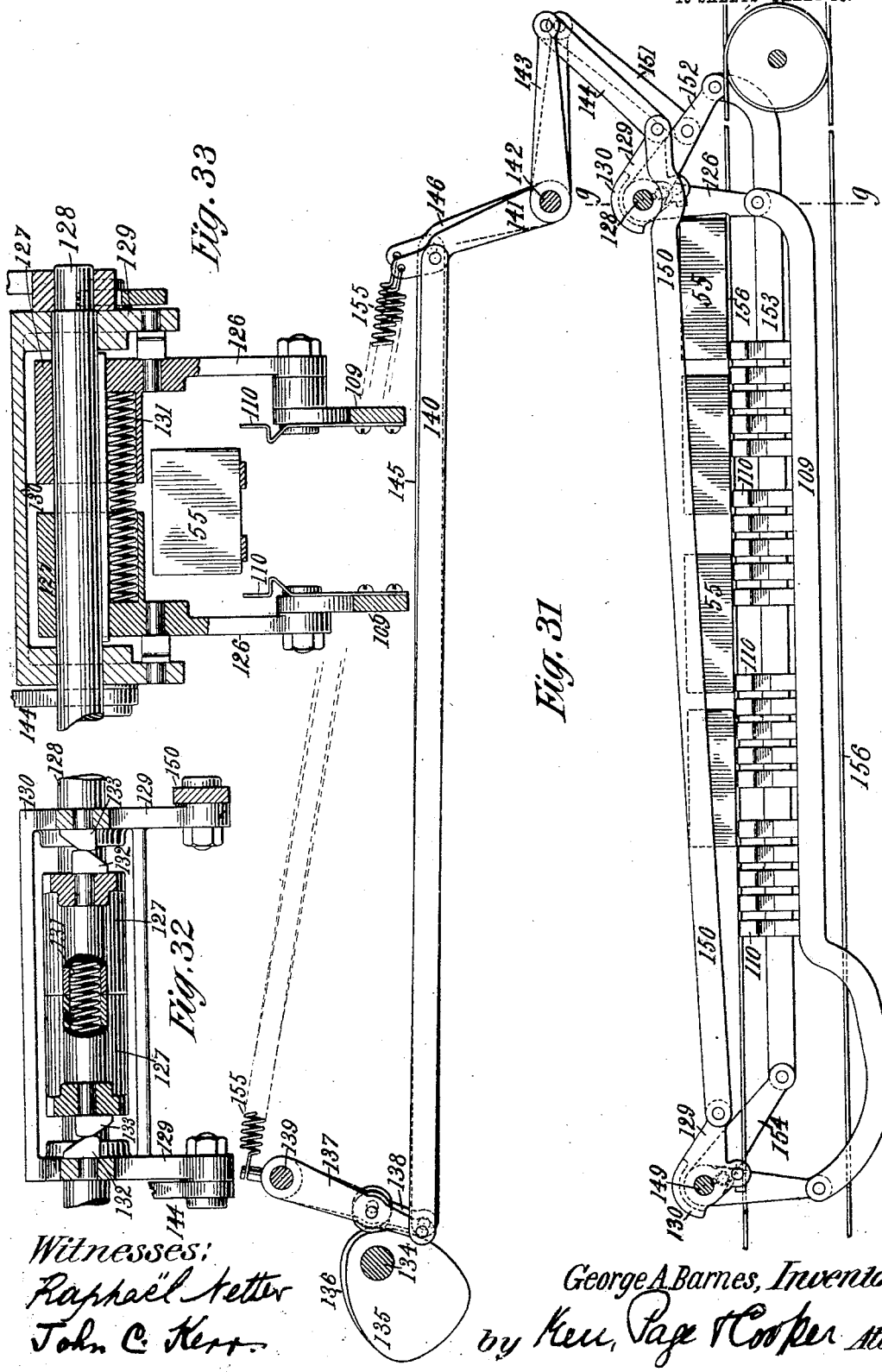

No. 803,538. PATENTED NOV. 7, 1905.
G. A. BARNES.
MACHINE FOR MAKING AND BOXING MATCHES.
APPLICATION FILED AUG. 5, 1899.
19 SHEETS—SHEET 19.
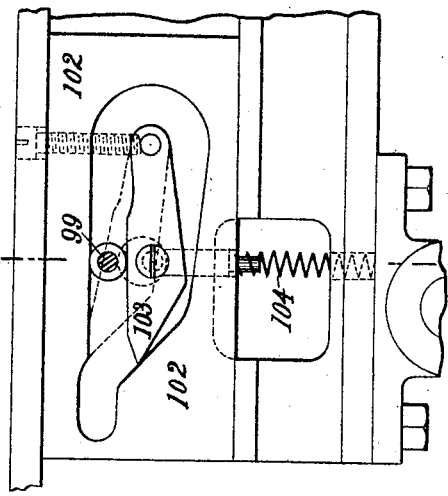
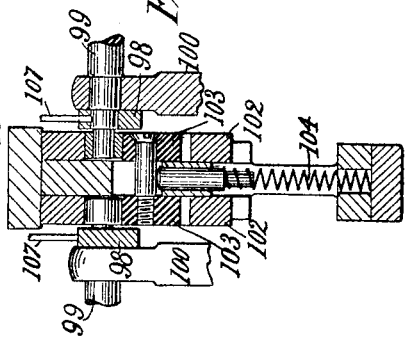
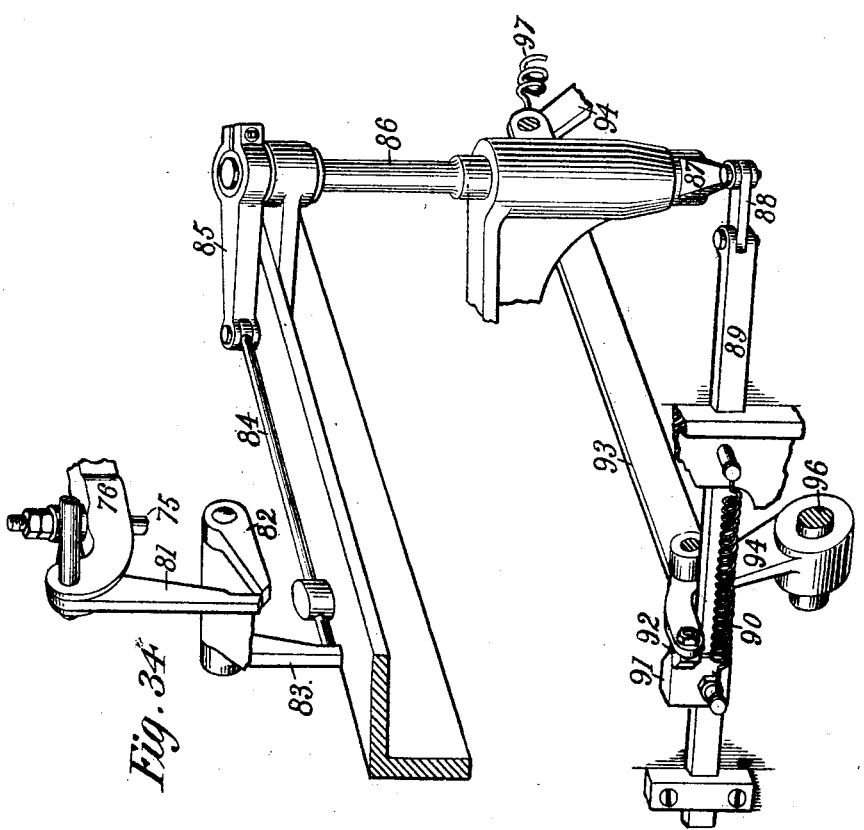
Witnesses:
Raphaël Netter
John C. Kerr
George A. Barnes, Inventor
by Kerr, Page Kerper attys

UNITED STATES PATENT OFFICE.

GEORGE A. BARNES, OF NEW HAVEN, CONNECTICUT, ASSIGNOR, BY MESNE ASSIGNMENTS, TO THE DIAMOND MATCH COMPANY, OF CHICAGO, ILLINOIS, A CORPORATION OF ILLINOIS.

MACHINE FOR MAKING AND BOXING MATCHES.

No. 803,538.     Specification of Letters Patent.     Patented Nov. 7, 1905.

Application filed August 5, 1899. Serial No. 726,253.

*To all whom it may concern:*

Be it known that I, GEORGE A. BARNES, a citizen of the United States, residing at New Haven, in the county of New Haven and State of Connecticut, have invented certain new and useful Improvements in Machines for Making and Boxing Matches, of which the following is a specification, reference being had to the drawings accompanying and forming a part of the same.

The present invention is a machine of novel construction adapted to make and box friction-matches in unlimited quantities and by a continuous operation, the said machines requiring only to be actuated by a suitable source of power and to be supplied with the materials of which the matches are composed and boxes to receive them.

The general plan of the machine as a whole may be gathered from the following brief outline of the series of operations which the elements are constructed and organized to perform.

Any suitable material, such as wood in the form of a long thin sheet of veneer of a width determined by the special construction of the machine or in two or more such sheets, is fed into the machine and by suitable cutters is divided up longitudinally into narrow strips suitable for the making of splints for the matches. The said strips as they are fed forward are cut crosswise into splints of the proper length, and these latter are caused to enter perforations in a series of carrier-bars, by which they are conveyed to a receptacle into which their ends are dipped to receive a coating of paraffin and to another from which their ends receive a suitable composition. They are then conveyed, while drying, to the point at which are located the mechanisms for detaching the matches from the carrier-bars and depositing them in regulated quantities in boxes.

In connection with the means for ejecting the matches or detaching them from the carrier-bars is arranged a device for receiving the matches as they are detached and depositing them in boxes ready to receive them, for removing the boxes as soon as they are filled to a predetermined level and supplying empty boxes in their place.

The mechanism which I have devised for carrying out the several operations above described involves numerous features and combinations, which I understand to be new in this art and original with myself, and in these reside the invention or improvements for which I now seek protection by Letters Patent.

I shall describe the mechanism as a whole by reference to the accompanying drawings, indicating the novel features of the same as far as possible in the description and claims.

Figure 3:
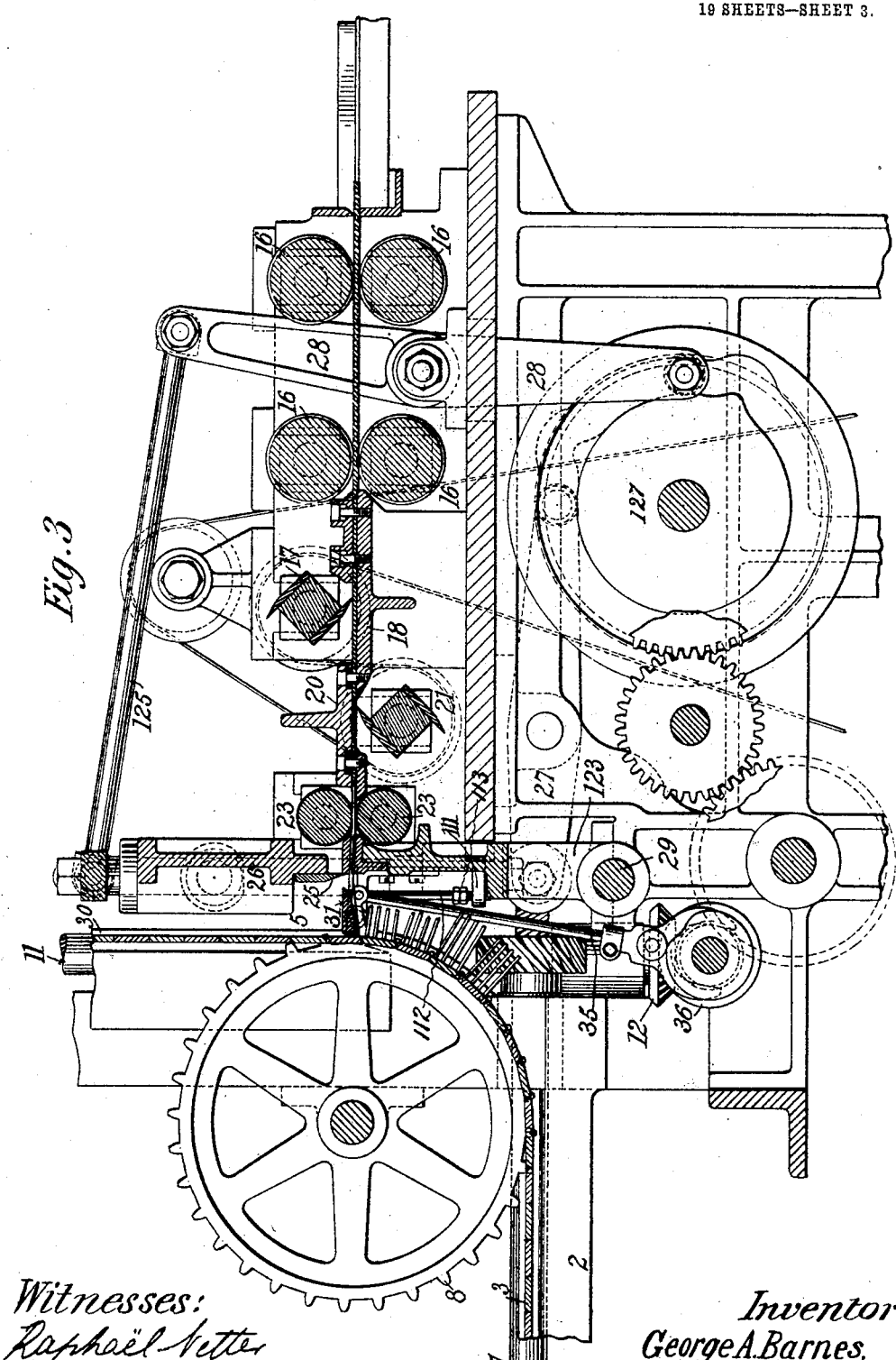
Figure 4:
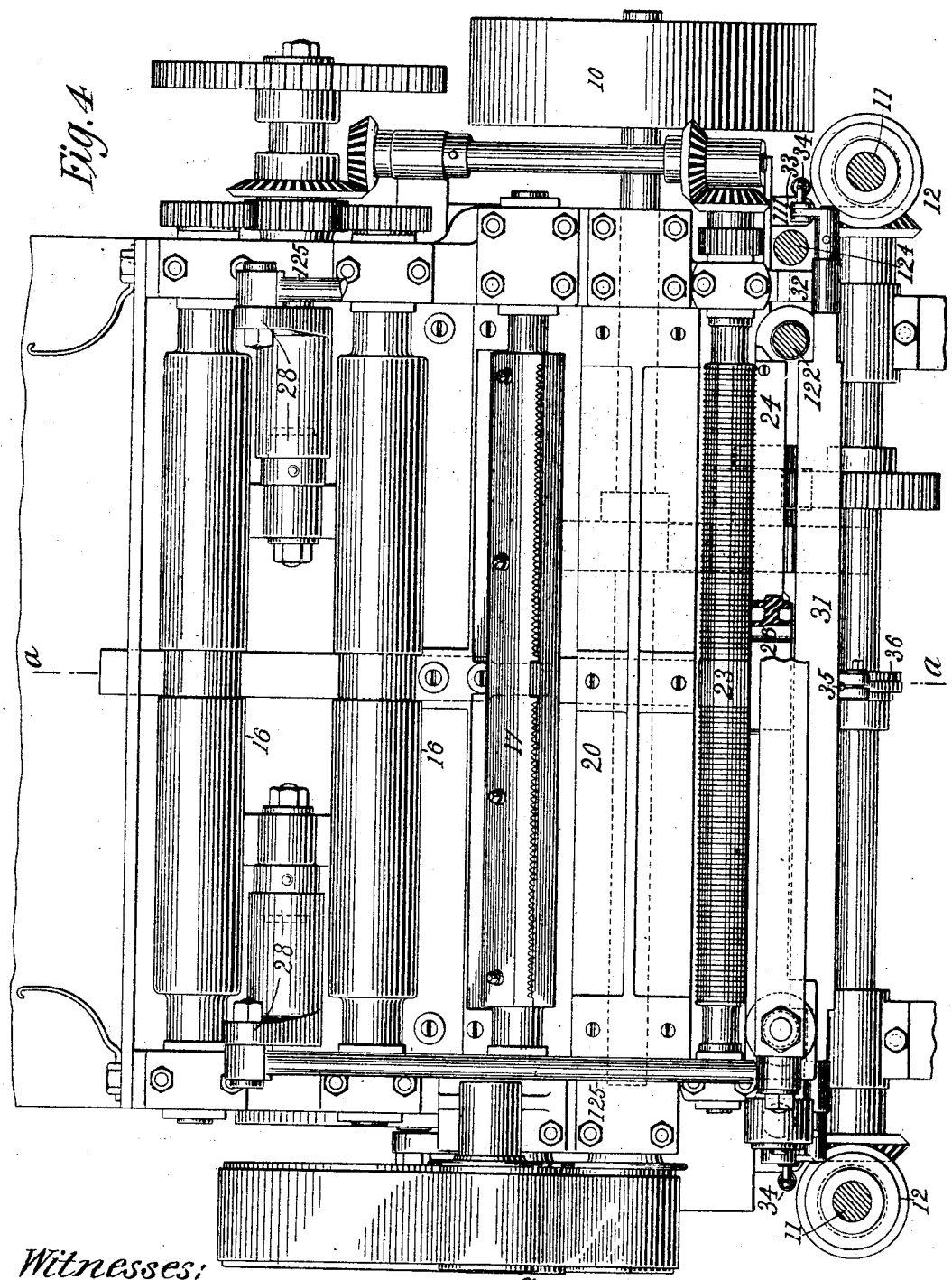
Figure 5:
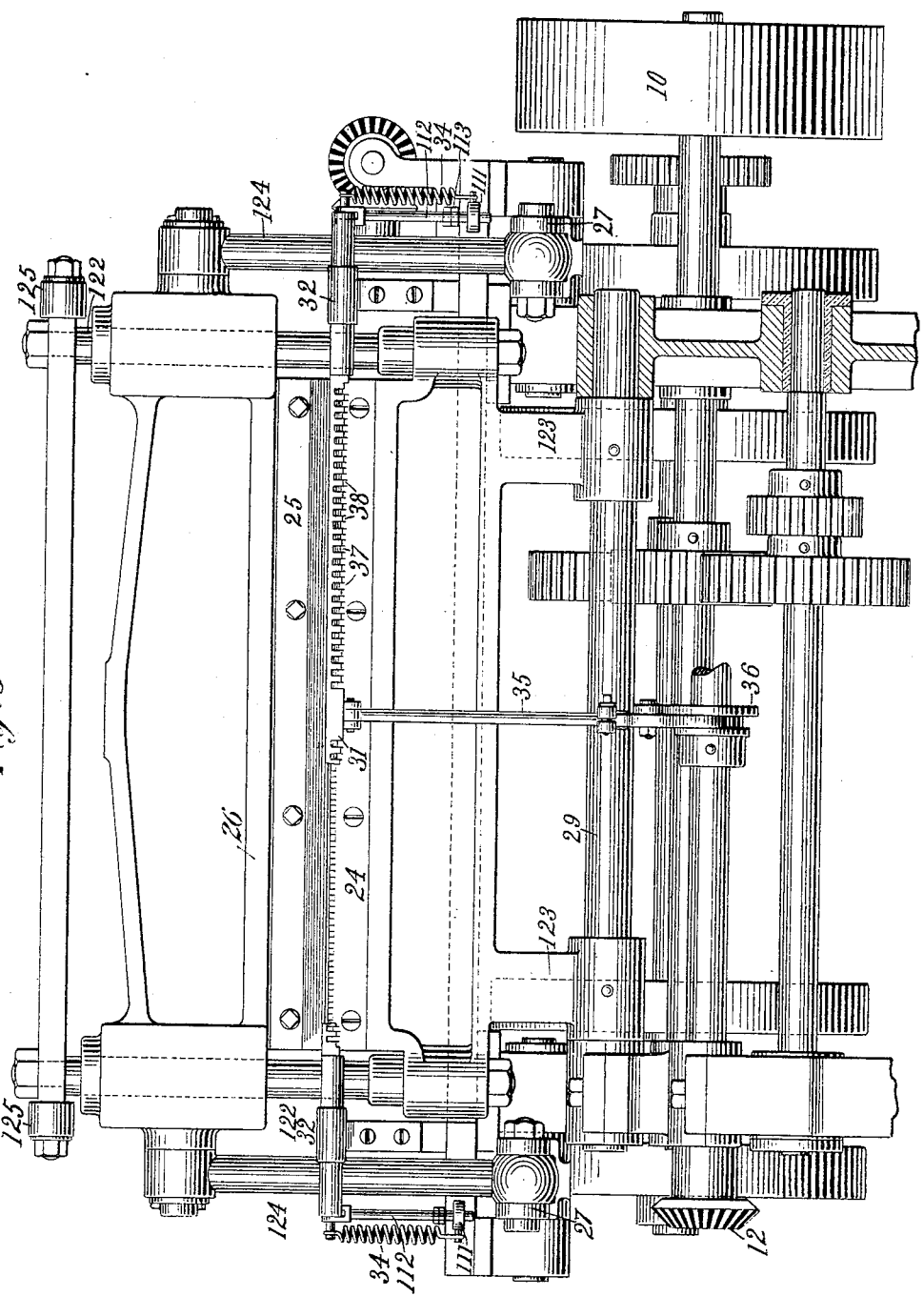
Figures 13, 14:
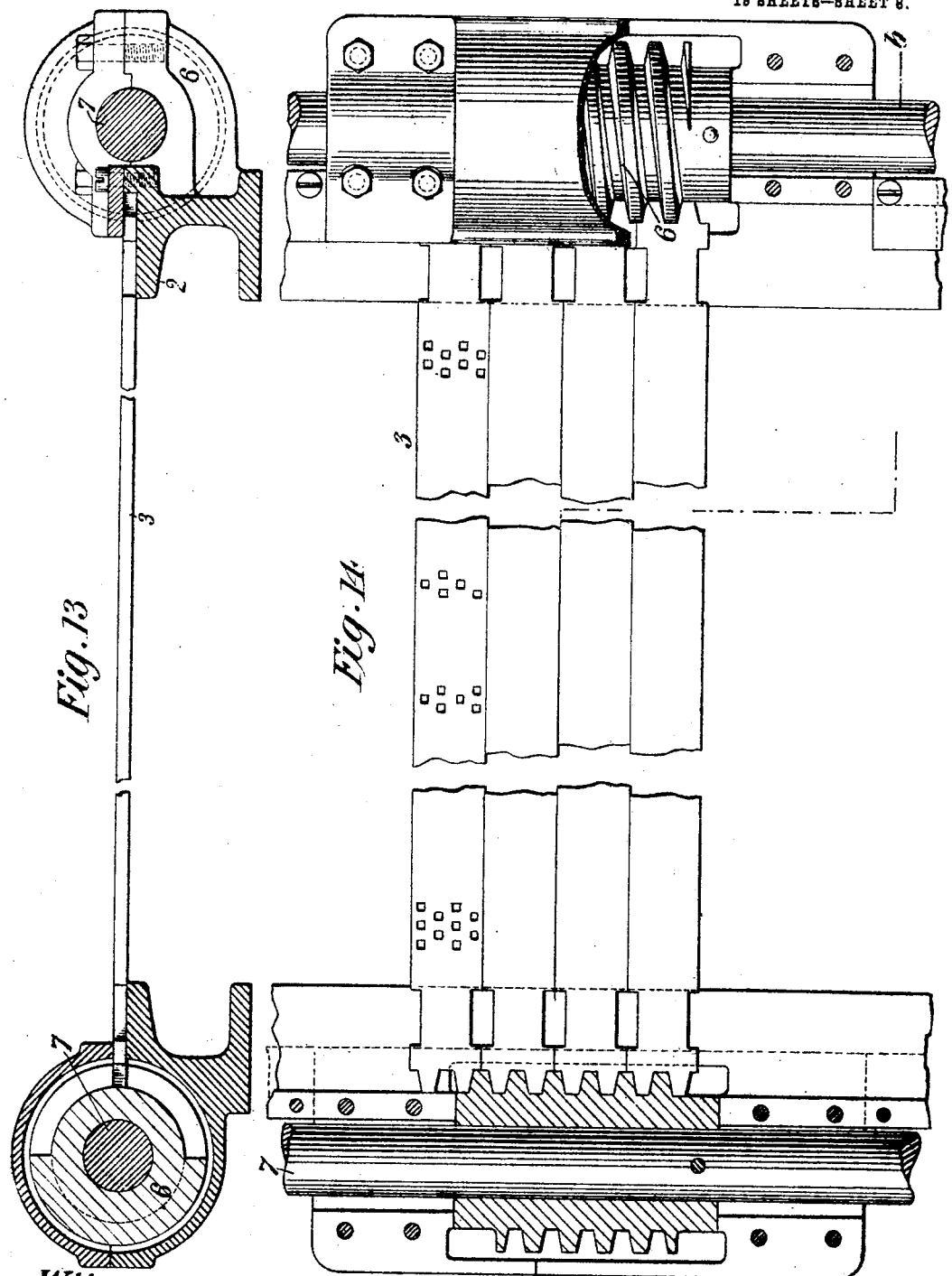

Figure 1 is a side elevation of the complete machine for making and boxing matches. Fig. 2 is a side elevation, on an enlarged scale, of the mechanism for cutting and feeding the splints. Fig. 3 is a vertical sectional view of the same mechanism, taken on the line $a\,a$ of Fig. 4. Fig. 4 is a top plan view of the splint cutting and feeding mechanism with parts omitted to exhibit underlying devices. Fig. 5 is a view in elevation of the same mechanism as seen from the left in Fig. 1. Fig. 6 is a similar view of the same mechanism as seen from the right in Fig. 1. Fig. 7 is an enlarged view, partly in section, of a portion of the carrier-bars with the mechanism for feeding, cutting, and inserting the splints. Fig. 8 is a front view of a portion of the carrier-bars. Fig. 9 is a section and front elevation of the guide-bar through which the splints pass to a reciprocating cutter-bar. Fig. 10 is a detail in front elevation and section of a device for directing the match-strips into perforations in the carrier-bars, the parts being shown on an enlarged scale. Fig. 11 is an enlarged detail of a portion of one of the rotary cutter-heads for forming the strips. Fig. 12 is a similar view of a modified form of cutter-head. Fig. 13 is an enlarged sectional view of the track for the carrier-bars, taken on line $b\,b$ of Fig. 14. Fig. 14 is a plan and part section of a portion of the track and mechanism for propelling the carrier-bars. Fig. 15 is a sectional view of the paraffin-tank and means for dipping the splints. Fig. 16 is a longitudinal sectional view of the composition tank and rolls. Fig. 17 is a partial cross-section of the same. Fig. 18 is a top plan and part sectional view of the mechanism for ejecting the matches from the carrier-bars. Fig. 19 is a front view of the carrier-bars as they appear in passing in front of the ejectors. Fig. 20 is a vertical section on lines $c\,c$ of Fig. 18 of the ejecting mechanism and a portion of the boxing mechanism. Fig. 21 is a side elevation and part section of the boxing mechanism, of which a portion only is shown in Fig. 20. In Fig. 21 the position of the parts is different from that shown in the preceding figure. Fig. 22 is a view of the boxing mechanism looking from the left in Fig. 1, the left-hand portion being a section on the lines $d\ d$ of Fig. 21, while the remaining portions are in elevation. Fig. 23 is a sectional elevation of the same mechanism on the planes of the broken line $e\ e$ of Fig. 21. Fig. 24 is a top plan view of the boxing mechanism with portions removed to exhibit the construction of underlying parts. Fig. 25 is a plan view of the same mechanism with the upper portions and some of the under portions removed to show the construction of the box feeding or transferring mechanism. Fig. 26 is an enlarged central vertical section of the devices for ejecting the matches and depositing them in boxes. Fig. 27 is an enlarged view in elevation of a portion of a carrier-bar and the devices for receiving the matches ejected therefrom. Fig. 28 is an enlarged view, partly in section, of a detail of the boxing mechanism. Fig. 29 is a perspective view, on an enlarged scale, of the device for receiving the ejected matches and transferring them to the boxes. Fig. 30 is a front view of the portion of the plate in which are set the ejecting-pins. Fig. 31 is an enlarged detail view of the mechanism for transferring the boxes when filled to the delivery-belt. Fig. 32 is a section on line $f\ f$ of Fig. 22. Fig. 33 is a section on line $g\ g$ of Fig. 31. Fig. 34 is a detailed view and perspective of a tripping mechanism controlling the removal of filled boxes and the substitution of empty boxes. Fig. 35 is an enlarged view of a portion of the box-feeding device. Fig. 36 is a section on line $h\ h$ of Fig. 35.

The general plan of construction and arrangement of the machine as a whole is shown in Fig. 1, in which 1 1 indicate the iron or steel bars or tubes of a frame affording a substantial and rigid support for an extended sinuous track or guide, along which a series of carrier plates or bars are continuously propelled by means hereinafter described. The mechanism for preparing the splints and inserting them in the moving carrier-bars is shown at A, and those for receiving and boxing the matches after they have been dipped, dried, and ejected from the carrier-bars at B, each of said mechanisms being mounted on suitable stationary supports.

The carrier-bars and the means employed for conveying the same to the machine are illustrated in Figs. 7, 8, 13, 14, and 16. Said bars are composed of comparatively narrow metal plates 3 of a length to fit in the track provided for them, which latter is formed by a series of horizontal angle-bars 2, with suitable channels or grooves to receive and confine the ends of the bars, semicircular guides 4 connecting the horizontal guides, vertical guide-bars 30 at the forward end of the frame, and rounded guides 5 5 at the forward corners.

The carrier-bars 3 are laid side by side in the guides or track in contact with each other, or substantially so, in order that there may be little or no play between them and consequent lost motion in propelling them. The ends of the bars are serrated, as shown in Figs. 8 and 14, so as to form a series of teeth which mesh with worm-gears 6 6, located at suitable intervals along the line of the tracks, and carried by shafts 7, rotated through suitable gearing by power derived from the main driving-shaft. The carrier-bars are also provided near their ends with notches, which in adjacent bars register to form openings, through which project the teeth 8 of spur-gears 9, mounted in the frame and adapted to rotate within the circular portions of the tracks or guides. Power may be applied to the spur-gears which enter the rounded guides 5 to assist the worm-gears 6 in propelling the carrier-bars.

In the normal operation of the machine the series of carrier-bars is maintained in constant and uniform movement through the endless guides or track by the propelling mechanism above described. In Fig. 2 is shown the means for applying the power which maintains said carrier-bars in motion. This consists of a belt-pulley 10, in gear with a vertical shaft 11 through beveled gears 12. On the shaft 11 are arranged worms 13, which impart rotation to the spur-gears 9, and also beveled gears 14, which impart rotation to the horizontal shafts 7.

In the machine which is illustrated in the drawings provision is made for the simultaneous reception and utilization of two sheets of veneer, the machine, in fact, being double; but the operation of the machine with respect to one sheet of veneer is the same as with the other, and either half or side of the machine may be used independently of the other.

I now refer to Figs. 2 to 6 for an explanation of that portion of the mechanism which prepares the splints and inserts them into the perforations provided for them in the continuously-moving carrier-bars. A sheet of veneer is fed into the machine, or two sheets side by side, as above explained, and being gripped by two pairs of feed-rolls 16 is advanced over a bed-plate 18 to a high-speed rotary cutter 17, by which a series of parallel grooves is cut in its upper surface. The sheet thence passes under a plate 20 and over a similar rotary cutter 21, by which another series of parallel grooves in the under surface is cut immediately under those on its upper surface, the depths of the grooves being such as to divide the veneer longitudinally into separate strips.

The character or special construction of the rotary cutters may be varied. For example, referring to Figs. 9 to 12, the cutters may be composed of a series of thin circular saws 22, in which case the veneer will be cut into square strips, or the cutter-heads may carry serrated plates 19, the teeth being so formed as to cut grooves that will result in round strips. In any case, however, the cutters are virtually saws which rotate at a high speed. The strips advancing from under the plate 20 pass between two corrugated rolls 23, by which they are forced forward through stationary guides 24, the passages through which are slightly inclined upward. At suitable intervals the strips as they issue from the guides 24 are divided in short lengths or splints by means of a cutter 25, which, as shown, has the form of a blade or bar. This cutter is designed to have a reciprocating motion and also an oscillating movement with variable speed in order that it may descend across the path of the strips just as they issue from the guides 24 and at the same time swing forward at the same rate of speed as that at which the strips are fed. This downward and forward motion continues until the cutter 25 has passed completely through the strips, when its forward motion is accelerated in order that it may be raised out of the path of the stock or strips advancing from the guides 24 without contact therewith. To secure this result, the cutter-bar is secured to a head 26, which is actuated by two sets of cam-levers, one set 27 imparting to it a reciprocating motion, while the other set 28 operates to oscillate the supports of the cutter-bar on 29 as a center.

The head 26 is adapted to slide on the vertical side bars 122 of a frame which is mounted on the shaft 29 by the arms 123. The cam-levers 27 are connected by links or bars 124 to the head 26, and the cam-levers 28 by links or bars 125 to the upper end of the frame 122, the cams 126 for levers 27 and cams 127 for levers 28 being properly formed to impart the desired movements to the cutter-bar. The two positions of the latter are indicated in Fig. 7.

The ends of the strips after issuing from the guides 24 enter a device which is known as a "staggerer." The function of this device is to deflect the splints alternately out of the plane in which they issue from the guides in order that each row may be diverted into two rows of staggered perforations in the carrier-bars. The movement of the cutter is so timed that it severs the splints from the strips approximately at the instant when the advancing ends of the splints enter the perforations in the carrier-bars. It will be borne in mind that the movement of the carrier-bars is continuous and that the strips from which the splints are cut are constantly advancing at a uniform rate. In order, therefore, that the splints at the instant when they are severed from the strips may be removed from the path of the advancing stock, I so construct the staggerer that simultaneously with the severing of the splints the rear ends of the same will be moved downward out of the path of the advancing stock. This device is constructed in the following manner: Between the cutter 25 and the series of carrier-bars is a plate 31, (see Fig. 10,) mounted on trunnions in stationary bearings 32 32, in which it is capable of partial rotation. The ends or trunnions of the plate 31 are extended beyond the bearings and provided with arms 33, to which are connected spiral springs 34, the other ends of which are connected to projections 111 from the stationary frame. The arms 33 are also connected to plungers 112, passing through perforations in the projections 111 and carrying adjustable lock-nuts 113, which serve to limit the downward movement of the plate 31. A rod 35, operated by a cam 36, is pivoted to the middle of the plate 31 and serves to tilt the same and lower its receiving edge. The springs 34 act upon the plate 31, exerting a force which tends to lower the bar 35, which is held up by the cam 36, except for a very brief interval, when a depression in the cam permits the rod 35 to drop, and thereby lower the receiving edge of the plate 31. This movement of the plate depresses for an instant the rear ends of the splints below the level of the advancing strips, so that when the plate 31 is restored to its normal position the splints will have had time to be carried forward by the moving carrier-bars sufficiently to permit of the free entrance of the advancing strips. The under surface of the plate 31 is formed with a series of grooves or channels 37 38, forming guides which diverge at opposite angles from the receiving edge of the plate, so that when a row of strips enters the said channels or grooves they will be alternately deflected and caused to enter the perforations of two adjacent rows in the carrier-bars. The strips being advanced by the feed-rolls pass through the staggering device and enter the perforations in the carrier-plates, which latter, as shown in Fig. 27, are countersunk, so as to insure the proper insertion of the splints at the instant when the cutter-bar descends, and by the accelerated motion of the latter at the end of its stroke the splints are forced securely home into said perforations. This operation is repeated as long as a veneer is supplied to the machine. The downward movement of the staggerer gives the rear end of the splints a downward movement in conformity to the movement of the carrier-bars, thus keeping the splints in proper relation to the holes in the carrier-bars and to the cutter, so that the splints may be forced into the holes and their slipping on the cutter prevented.

The splints inserted in the carrier-bars in the manner above described are conveyed by said bars along the track to a receptacle 39, containing melted paraffin. Immediately over this receptacle there is a depression in the track 2, as indicated at 40 in Fig. 15, by reason of which the ends of the splints are dipped into the paraffin. From this point the splints are conveyed to the device which applies the composition. This consists of a receptacle 41, Fig. 16, heated by a steam-pipe 42, and containing a roll 43 and a stirrer 44. The roll takes up on its surface a film of composition from the receptacle 41, the thickness of which is regulated by scrapers 113, carried by adjustable supports 114, and as the splints pass over the roll 43 they take off the proper quantity of the composition to form the igniting-heads. After receiving their heads of composition the matches are conveyed by the carrier-bars along the sinuous track, sufficient time being occupied by them in their advance toward the ejecting devices to permit them to thoroughly dry. It will be understood that any of the usual devices for facilitating the drying of the matches may be employed, and in this connection I may state that in practice I employ not only such devices, but also means, such as an air-blast, for carrying off the sawdust produced by the rotary cutters and other devices for similar purposes which are well known in the art and which I do not deem it necessary to describe in detail herein. As the carrier-bars charged with the dried matches approach the end of their course they pass in front of a device which detaches the matches from them. This device, which for convenience may be termed the "ejector," is best shown in Figs. 18 and 20. It comprises a plate or bar 46, in the face of which are set a number of pins 47, and which forms the forward end of a rectangular frame, the opposite end of which is a bar 48, carrying rollers 49, and the sides of which are composed of bars 45. Between the sides of the said frame is a rectangular frame 115, mounted so as to turn freely on a shaft 51. Arms 50 extend from the frame 115 toward the series of carrier-bars and are provided with projections carrying studs 116, which pass through the sides 45 of the outer frame and so as to slide therein and afford supports for the forward end of said frame. The sides 45 also contain slots, or said sides are formed of parallel bars which permit the free passage between them of the shaft 51 and a shaft 117. An arm 52 extends rearwardly from the frame 115 and is provided at its end with rollers, which run on a cam 54. As the shaft 117 revolves the arm 52 is raised and depressed, and this motion is communicated to the plate 48, which undergoes an oscillation of limited extent. At the same time cams 118 on the shaft 117, upon which bear the rollers 49, impart to the frame, of which the plate 46 forms a part, a reciprocating motion. Springs 56, connected at one end to the stationary frame and at the other end to pivoted levers 120, bearing against rollers 119, mounted on studs set in the sides 45, act against the cams 118 so that the combined action of the springs and cams effects a reciprocation of the plate 46 toward and away from the carrier-bars. The parts described are so arranged and their movements so timed that the plate 46, which carries the pins 47, is advanced at the proper instant toward the series of traveling carrier-bars to cause the pins to engage with the rear ends of one or more rows of matches and force the latter out of said bar; but inasmuch as the carrier-bars are in constant motion and the matches to be ejected require a complete thrust of the pins 47 the plate 46 is given a downward motion corresponding to that of the carrier-bars by the mechanism above described. The movement of the plate 46 therefore is an orbital movement due to the conjoint action of the springs 56 and cams 118, on the one hand, and the frame 115, on the other hand, which is oscillated by the cam 54.

The arrangement of the ejecting-pins 47 in the plate 46 is in large measure arbitrary; but since the matches ejected from the carrier-bars are to be deposited in boxes and a special mechanism for this purpose is necessary I prefer to arrange the pins 47 in a certain definite order, as is shown in Fig. 30. The purpose of this will be made evident by the description of the boxing mechanism, to which I now pass.

In front of the series of carrier-bars and somewhat below the level at which the matches are ejected from the same a number of boxes 55 on supports, hereinafter to be described, are held ready to receive the matches. Above each of the said boxes and supported by a table or platform 121 is a chute 57, through which the matches drop into the boxes. Immediately over the series of chutes on each side of the machine is a frame or box without bottom, with front and rear sides or plates 58 59. Below the said boxes and on a level just below that at which the matches are ejected from the carrier-bars are a series of reciprocating troughs or conveyers 63, which, by means of a cam or eccentric 60, levers 61, and connecting-link 62, are caused to advance until their forward ends nearly reach the carrier-bars and are then retracted until they pass beyond the plates 59. The construction and relation of these parts are shown in Fig. 29. The conveyers or troughs 63 are secured to suitable blocks or heads 64. The rear plates 59 are formed at their lower edges with V-shaped projections that conform to the shape of the troughs and extend down into the latter, while the lower edges of the plates 58 lie above the upper edges of the said troughs. These parts are so arranged and their movements are so timed that at the instant when the ejector is thrust forward in the operation of detaching the matches the series of troughs 63 will be at or near their extreme forward position and directly under the matches. The latter, therefore, in dropping fall into the troughs and by the latter are conveyed away from the carrier-bars and under the plates 58. When the matches encounter the projections on the lower edges of the plates 59, their movement is arrested; but as the troughs continue their travel the matches are scraped off from the latter and dropped down into the boxes 55.

I have stated that I arrange the ejecting-pins 47 in a special manner, and the purpose of this will be now understood from a consideration of Figs. 27 to 29. It is obviously a practical necessity that the matches should be deposited in the boxes as nearly as possible parallel. For this reason I use the narrow V-shaped troughs 63, in which the matches have no chance of displacement, and in order that the matches may be detached from the carrier-bars as near to the bottom of the troughs as practicable, so as to have but a short distance to fall, the ejecting-pins are arranged in a zigzag line or in a series of V's. Assuming Fig. 27 to illustrate the conditions at the instant when the pins 47 have completed their forward thrust, it will be seen that three of the matches ejected into each trough were below the level of the edges of the trough and one just above the junction of two troughs. To insure that these latter shall fall into the troughs and not lodge on the adjoining edges of two troughs, bars 65 with knife-edges are secured to the plate 58 and occupy the spaces between adjacent troughs.

The form and construction of the eccentric and the arm 61, which it operates, are such that the retrograde movement of the troughs 63 after receiving a charge of matches is at first slow and is gradually accelerated in order that the matches may not be caused to slip out of the troughs by reason of their inertia.

As a further precaution against the irregular disposition of the matches in their boxes and their displacement from parallelism therein I employ a device which is illustrated in Figs. 21, 22, and 28. This consists of a series of thin metal plates 67, secured to blocks or heads 68 and parallel with the matches. The blocks 68 are suspended by rods 66 from arms 69, turning freely about a shaft 70 and rocked by cams 71. The said arms 69 are depressed by one or more spiral springs 72 and by their motion carry the series of plates 67 down into the boxes 55. The motion of the plates is so timed that they will be at their lowest point while the matches are dropping into the boxes from the receding troughs 63. The plates 67 pass freely between the edges of adjacent trough 63 and do not interfere with the to-and-fro movement of the latter. As the matches accumulate in the boxes the downward movement of the plates 67 is opposed; but although the lower edges of the plates encounter the matches in the boxes the springs 72 yield, so as to prevent injury to the plates or to the matches. I also provide means for withdrawing the boxes as soon as they are filled to a predetermined level and supplying empty boxes in their place. The mechanism for this purpose comprises, primarily, a tripping device, which is called into operation when the matches in any one of the boxes have reached the desired level. This mechanism is shown in Figs. 20, 21, and 26 and in detail in Fig. 34.

What may be termed "plungers," and which consist of boxes with ends 73 and sides 74, Fig. 22, but without top or bottom, are supported by rods 75 from the end of arms 76, loosely mounted on the shaft 70, and caused to reciprocate between the plates 58 59 in the space surrounding the heads 68, which carry plates 67, by the combined action of cams 77 and springs 78. The rods 75 pass freely through the ends of arms 76 and are provided with movable sleeves 79, which are held up in contact with the arms 76 by the force of spiral springs 80, surrounding the rods and interposed between the plungers and the said sleeves. The length and play of the plungers are so adjusted that at each revolution of the cams 77 the lower ends of the plungers descend to the predetermined level of the matches in a full box. The movement of the plunger is, moreover, so timed that it is below the path of the reciprocating troughs or conveyers 63 only in the interval during which the said troughs are withdrawn beyond the plate 59 after having deposited their charge of matches. So long as the lower ends of the plungers encounter no resistance they do not affect the operation of the apparatus; but when the successive charges of matches deposited in the boxes have filled the latter to a level above that to which the plungers descend the downward movement of the latter is arrested, and the springs 80 yield to permit the arms 76 to complete their downward movement in obedience to the tension of spring 78, so that the arms move downward over the rods 75, as indicated in Fig. 20. The plates 74, which constitute the sides of the plungers, are cut away, as shown in Fig. 22, to permit the plates to pass down through the chutes 57 into the boxes beneath them.

To the end of one of the arms 76 on each side of the machine is pivoted a bell-crank lever 81, the upper end of which engages with the upper end of a rod 75, so that when the arm 76 moves downward over the said rod the lever 81 is turned on its pivot, shifting the lower end over toward the right, assuming the machine to be in the position shown in Fig. 21. In the path of the said lower end of lever 81 is the arm 82 of a bell-crank lever pivoted to the stationary frame, and a predetermined movement of lever 81 depresses this arm 82, causing its other arm 83 to impinge upon the end of a rod 84, connected with an arm 85 of a rock-shaft 86, and to impart a partial rotation to the latter. A second arm 87 on rock-shaft 86 is connected, by means of a link 88, with a sliding bar 89 and imparts a movement to said bar against the tension of a spiral spring 90, connected to said bar and to a fixed support, respectively. When the bar 89 is thus moved, a projection 91 thereon is shifted out of the path of a catch 92 on a bar 93, with which it is normally in engagement. The effect of this is to release the mechanism which withdraws the filled boxes and inserts empty ones in position to receive matches.

As will be seen, the machine in the form shown is double. It would be possible to use a single tripping device for the entire machine, provided both sides are in constant use, for since the number of matches which fall into the several boxes in a given time is approximately equal in all the whole series of boxes will be filled to approximately the same level at the same instant; but as it may be desirable to use only one-half of the machine two tripping devices are employed, one for each of the two plungers, and each of which acts independently of the other to release the box-feeding mechanism on its own side of the machine.

The bars 93, as will be seen by reference to Figs. 20, 21, and 25, connect the arms 94 of two rock-shafts or sleeves 95, which turn on shafts 96. Spiral springs 97 are connected with said bars or arms and exert a constant pull upon the same, which becomes effective to partially rotate the said arms or sleeves when the catches 92 are released, as above explained.

Referring still to the figures mentioned, 98 98 are the sides of rectangular frames with cross-bars 99, each of said frames being connected with the ends of plungers 100, working through holes drilled in the sleeves 95 and connected to said sleeves by springs 101. The side bars 98 are provided with projections carrying rollers that extend into openings in plates 102, fixed to the machine on opposite sides of the frames. In each of said openings and near one end of the same there is pivoted to a stationary part of the frame of the machine a tongue 103, which by a spring 104, (shown in dotted lines in Fig. 21 and in detail in Figs. 35 and 36,) is normally held up against the upper edge of the said opening, as indicated in full lines in Fig. 20. The edges of these openings, together with the pivoted tongues 103, constitute tracks or cams, which when the catch 92 is released and the springs 97 and 100 are brought into play impart to the frames 98 a peculiar movement, first backward horizontally, then obliquely downward, then horizontally backward, and then upward. When the frame has reached this latter point in its course, arms 105, fixed to one of the rock-shafts 96, force the arms 94 back to their normal position, and this brings the frame 98 forward horizontally and causes the catch 92 to again engage with the stop 91 on the sliding bar 89. One of the rock-shafts 96 carries at its rear end a crank-arm $96^a$, which is connected by a link $96^b$, a lever $96^c$, and a second link $96^d$ with a crank $96^e$ on the shaft. It will be observed that the movement of the frame 98, as above described, is produced by the oscillation of the plungers 100 and their simultaneous movement through the sleeves 95 and that while the tongues 103 yield and permit the rollers carried by the frames 98 to pass above them to the left the said rollers must pass below the tongues in moving to the right.

It having been now explained that when any box has been filled with matches the tripping mechanism is caused to set in operation the means which impart the movement described to frames 98, the part which these mechanisms play in removing full boxes and substituting empty ones will be readily understood.

Each cross-bar 99 of the frames 98 is provided with a series of fingers 106 or 107, which project upward between the slats 108 of a platform or table. By means to be described rows of empty boxes are fed onto said platform in certain definite positions and so that when a frame 98 is caused to go through its described cycle of movement each row of the said fingers drops from behind one box of a given row, rises behind the box immediately in its rear, and forces it forward the required distance. The fingers 107 are straight and operate merely to shift the boxes step by step along the platform 108 toward the chute through which the boxes receive the matches. The fingers 106, however, are peculiarly shaped, as shown in Figs. 20 and 21, and have horizontally-extended ends with a shoulder at the rear, so as to pick up the boxes bodily and convey them over to points immediately under the chutes, holding them in such positions until they are filled with matches.

It being borne in mind that the boxes are not moved by the operation of any mechanism until the tripping device comes into play, it will be seen that the necessary support for the boxes while filling is afforded by the fingers 106. The moment, however, that the trip is operated the fingers 106 are withdrawn from under the full boxes, and this requires another support to receive the full boxes and convey them away to make room for the empty boxes, which are immediately after brought into position. The means for this will now be described.

Extending parallel with the carrier-bars and under the row of boxes which are receiving matches are two bars 109, constituting the sides of a frame which has the following function: As soon as the fingers 106 are withdrawn from the full boxes the latter are received by supports carried by the bars 109 and are lowered with a gradually-accelerated motion onto a conveyer or traveling belt. The bars then spread to release the boxes and passing up alongside of them resume their original position ready to receive others. For accomplishing this I have devised the following devices: To the bars 109 are secured a series of upright springs or blades 110, bent inwardly or provided with shoulders near their ends to afford a seat for the boxes. The fingers 106 at the end of the movement which conveys the boxes into position to be filled pass down through the spaces between the springs 110 without interference therewith and when withdrawn leave the boxes to settle down into the seats which said springs afford. The bars 109 go through the cycle of operations above described at regular intervals whether the boxes are deposited on the springs 110 or not; but, as will be seen from the above explanations, this is possible without any interference between the different parts, while the operation of each is so timed that the withdrawal of the fingers 106 always precedes by just the proper interval the downward movement of the bars 109.

The devices for removing the filled boxes, to which I shall now refer, are shown in Figs. 22 to 25 and 31 to 33. As above stated, the blades 110 are mounted on parallel bars 109. Each of said bars is pivotally connected to and supported at its ends by arms 126, extending from sleeves 127, splined to rock-shafts 149 and 128, respectively. Mounted also on said rock-shafts 149 and 128, but free to turn thereon, are plates 129, rigidly connected by cross-bars or hoods 130. The sleeves 127 are located between the plates 129 and by the pressure of spiral springs 131, interposed between them, are subjected to a constant tendency to spread apart. This tendency is opposed and normally prevented by the engagement of projections 132 on the plates 129 and 133 on the sleeves.

At a convenient point on the frame of the machine, as on a shaft 134, and fixed thereto, are two cam-disks 135 and 136. Levers 137 and 138, pivoted to a stationary bar 139, carry rollers which bear upon the two cams, respectively. Lever 137 operates the plates 129 through a bar 140, which connects the lever 137 with the end of an arm 141, fixed to a rock-shaft 142, which latter has a second arm 143 connected eccentrically by a link 144 with one of the plates 129 on shaft 128. The other plate 129 on said shaft is connected by a bar 150 with its corresponding plate on shaft 149. Lever 138 operates the arms 126 through a bar 145, which connects it with one end of a bell-crank lever 146, turning loosely on a shaft 142. Lever 146 is connected by a link 151, pivoted at its other end to an arm 152, fixed to the shaft 128. A bar 153 connects arm 152 to the end of a corresponding arm 154, fixed to the shaft 149.

Spiral springs 155, connected at one end to a stationary part of the machine and at the other to the two bell-crank levers 141 and 146, respectively, maintain the levers 137 and 138 in contact with the cams 135 and 136.

It will be observed that cams 135 and 136, while generally of the same contour, differ from each other at one point and will consequently impart to the arms 126 and plates 129 movements of different amplitudes at certain positions of the cams. This results in the following action: Normally, as has been explained, the engagement of the projections 132 and 133 keeps the sleeves 127 forced closely together, and this continues for all positions of the cams 135 and 136 except when the portions of different contour are presented to the rollers on the levers 137 and 138. At such times the relative positions of the arms 126 and the plates 129 (normally that shown in Fig. 32) are changed, so that the projections no longer engage, but, passing by one another, permit the springs 131 to expand and spread the arms 126, as shown in Fig. 33. By the subsequent movement of the cams 135 and 136, which rocks or oscillates the plates 129 and arms 126, the projections are again brought into engagement, their faces being beveled, as shown, to permit them to slide readily upon each other. As the ends of arms 126 swing through the arc of a circle, every point on bars 109, as well as the supports for the boxes 55, must do the same. The latter by such movement are therefore conveyed from the level at which they were filled through the arc of a circle to a lower level, where they encounter a belt 156. At the instant of reaching such belt the boxes are released by the spreading of the bars 109 and are conveyed off by the traveling belt 156. The bars 109 remain spread until they have passed up above the boxes on the traveling belt, when they are again brought to their normal position.

Means for conveying the filled boxes and depositing them upon the belt 156 are specially designed to prevent the displacement of the matches within or from the boxes. Starting from a state of rest, the boxes must first move slowly, so as not to drop away from the matches. They must, moreover, have acquired the same speed as the belt 156 and must be moving in the same direction as the latter at the instant when they are deposited thereon. These results are secured by moving the boxes through the arc of a circle, as described, the belt being tangential to the arc, and by giving to the cams such shape that the movement of the box-supports will be gradually accelerated from the time of starting to the moment when the boxes are deposited on the belt.

As the belt 156 must have a comparatively rapid motion, I make it of two bands which run over pulleys 157. On the shaft upon which said pulleys are mounted are loose pulleys 158, carrying two other bands 159, composing a belt which has a slower motion. This latter receives the boxes from the rapidly-traveling belt and conveys them to a point where they can be conveniently taken off by attendants or passed to another machine for putting covers on them.

It remains now to describe the means for feeding the empty boxes into the machine, and for this purpose I now refer to Figs. 24 and 25. A series of pulleys 160 support carrier-belts 161 in the plane of the table formed by the bars 108. These belts have a movement in said plane toward the table, as indicated by the arrows in Fig. 24, and bring up empty boxes to the table. When the boxes reach the edge of the table, they are forced onto it by those on the belts, the friction of a long row of boxes accumulating on the belts being greater than that of the few on the table. Suitable guides are provided for the boxes which pass over the table through said guides until they encounter a transverse partition, by which their movement is arrested. While six belts have been shown for conveying boxes to the machine, the number can be varied as found convenient. The platform 121 has depending guides 163 over the table 108, the guides being formed so as to provide paths from each one of the belts for conveying boxes to the machine and four paths at right angles to the line of the belts, in which latter the foremost box of each row is arrested and through which it passes to the filling mechanism. The boxes as they are delivered by the belts pass forward between the guides until they reach one of the transverse partitions 163, and in the position where stops the foremost box of each row is exactly in position to be taken up and advanced by the arms 106 on cross-bars 99, as hereinbefore explained, and it is, moreover, evident that as soon as one box of a row has been thus displaced along its appropriate transverse path its place will be immediately taken by the next box of the row advanced by those in the rear. If smaller boxes be used, all of the belts 161 will be employed, the transverse paths which convey the boxes to the filling mechanism being arranged accordingly.

In the description of the machine given above I have omitted specific reference to many parts—such as supports, belts, pulleys, gears, and the like—as these are or may be capable of wide variation in construction and mode of operation and are well understood by those skilled in the art. I have also refrained as far as possible from assigning to the various elements described specific locations, as these are matters largely of design and in many respects not essential to the invention. I would also state that I do not limit myself to the specific form of the various elements comprising the machine, and in some respects I may without departure from the invention use other means which are now recognized as equivalents in the art for effecting certain of the operations necessary to the general result. For example, I may use any suitable mechanism for preparing the splints and inserting them into the carrier-bars or other means than those shown for dipping and drying the matches; but in these respects the features which I regard as of my invention will be pointed out by the claims.

Having now described my invention, what I claim is—

1. In a match-machine, the combination of a carrier having a continuous motion past the splint-receiving point, such carrier having means for holding splints in rows, and splint-feeding mechanism having means for moving the latter in the direction of motion of the carrier, substantially as described.

2. In a match-machine, the combination of a carrier for match-splints, a cutter for cutting off the splints, means for giving said cutter a movement transverse to the first-mentioned movement and in the direction of the length of the splints across the material from which the splints are formed, and also a movement toward such carrier, substantially as described.

3. In a match-machine, the combination of a carrier for match-splints, a cutter for cutting off the splints, and means for giving to said cutter, in addition to its severing movement, a movement transverse to the first-mentioned movement and in the direction of the length of the splints, to feed the splints, substantially as described.

4. In a match-machine, the combination of a carrier for match-splints, a cutter for cutting off the said splints, and means for giving to such cutter, in addition to its severing movement, a movement transverse to the first-mentioned movement and in the direction of the length of the splints, to feed the splints to the carrier, substantially as described.

5. In a match-machine, the combination of a cutter for cutting off match-splints, a carrier having holders for splints, and means for giving to said cutter, in addition to its severing movement, a movement transverse to the first-mentioned movement and in the direction of the length of the splints to place the splints in position to be held by said holders, substantially as described.

6. In a machine for making matches, the combination with means for feeding a row of extended match-strips in the direction of their length, of a cutter, means for moving said cutter at predetermined intervals across the path of the advancing strips, to cut off match-splints therefrom, and at the same time in the direction of travel of the same, and a carrier having means for receiving and holding the splints, substantially as described.

7. In a machine for making matches, the combination with means for feeding a series of extended match-strips in the direction of their length, of a cutter adapted to divide said strips into splints suitable for matches, means for moving said cutter at predetermined intervals across the path of the advancing strips and, at the same time, in the direction of and at the same rate of travel as the strips, and a carrier having means for receiving and holding the splints, substantially as described.

8. In a machine for making matches, the combination with means for feeding a row of extended match-strips in the direction of their length, of a cutter, means for simultaneously reciprocating and oscillating said cutter at predetermined intervals whereby it is moved vertically across the line of strips and at the same time horizontally in the direction of movement of said strips, and a carrier having means for receiving and holding the splints, substantially as described.

9. In a machine for making matches, the combination with means for feeding stock in a suitable path, of a cutter extending across said stock and adapted to sever match-splints therefrom, means for moving said cutter through and along the path of travel of said stock and back again, the forward movement of the cutter being accelerated upon the severance of the splints thereby initially to its return for a successive operation, and a carrier for receiving and holding the splints thus severed, substantially as described.

10. In a machine for making matches, the combination with means for feeding a series of extended match-strips along a suitable path, of a cutter adapted to divide said strips into match-splints, means for moving said cutter through and along the path of travel of the said strips, and back again, the forward movement of the cutter being accelerated upon the severance of the splints from said strips initially to the return of the cutter for a successive operation, and a carrier for receiving and holding the splints thus severed, substantially as described.

11. In a machine for making matches, the combination with a continuously-traveling carrier, and means for feeding a series of extended match-strips in a path at right angles, or substantially so, to the carrier, of a cutter adapted to divide said strips into match-splints, means for imparting a compound movement to said cutter including reciprocation in a path intersecting that of the strips and movement in the direction of travel of the strips and back again, the forward movement of the cutter being accelerated when it has passed through said strips, substantially as described.

12. In a machine for making matches, the combination with means for feeding a series of extended match-strips in a suitable path, of a cutter extending across said strips and adapted to divide the same into match-splints, means for moving said cutter through and along the path of travel of said strips and back again, and a carrier into which the splints are thrust by the action of the cutter, substantially as described.

13. In a match-machine, the combination with means for feeding stock in a suitable path, of a pivoted frame, a cutter movable in guides carried by the frame, means for oscillating said frame in the direction of movement of said stock and back again, means for reciprocating the cutter into and from said stock during the oscillation of the frame whereby match-splints are severed from the said stock, and a carrier into which the splints are thrust by the action of the cutter, substantially as described.

14. In a match-machine, the combination of means for feeding match-strips in a suitable path, a pivoted frame, a cutter adapted to slide in guides carried by said frame, means for oscillating said frame in the direction of movement of the said strips and back again, means for reciprocating the cutter into and from said strips during the oscillation of the frame whereby match-splints are severed from said strips, and a carrier into which the match-splints are thrust by the action of the cutter, substantially as described.

15. In a match-machine, the combination with means for feeding long lengths of match-strips in a suitable path, of a pivoted frame, a head adapted to slide on bars or guides forming a part of said frame, a cutter secured to said head, levers connected to the frame, and cams for oscillating the frame through said levers, whereby the frame is caused to move in the direction of travel of the match-strips and back again, levers connected with the sliding head, cams for reciprocating the head through the levers connected therewith, whereby the cutter is caused to move into and from the strips to sever match-splints therefrom during the oscillation of said frame, and a carrier into which the splints are inserted by the action of the cutter, substantially as described.

16. In a match-machine, the combination of a continuously-moving carrier for match-splints, means for feeding splints to said carrier, and means independent of the carrier and feeding means for giving to the splints a movement in the direction of motion of said carrier, substantially as described.

17. In a match-machine, the combination of a carrier for match-splints, means for bringing one end of said splints in connection with said carrier, and means for bearing upon and giving the opposite ends of said splints a motion in the direction of movement of said carrier, substantially as described.

18. In a match-machine, the combination of a carrier for match-splints, means for bringing one end of the splints in connection with said carrier, means independent of said carrier for bodily bearing upon and giving the opposite end of the splints a motion in the direction of movement of said carrier, and means for forcing the splints into a position where they are held and carried by said carrier, substantially as described.

19. In a machine for making matches, the combination with means for feeding a series of extended match-strips, a cutter for dividing said strips into splints of predetermined length, a traveling carrier for the splints, and a guide movable in the direction of motion of the carrier and back again and adapted to bear upon and deflect the severed splints from the line of movement of the advancing strips, substantially as described.

20. In a match-machine, the combination of a carrier having means for holding match-splints, a guide for directing the splints into said holders, means for moving bodily said guide to impart to the splints a movement in the direction of motion of said carrier, and a splint-cutting knife, substantially as described.

21. In a machine for making matches, the combination with a series of continuously-moving carrier-bars, and means for feeding a series of extended match-strips, of a cutter for dividing the said strips into splints, a guide for bearing upon and directing the advancing ends of the splints into perforations in the carrier-bars, and means for bodily moving the guide so as to deflect the opposite ends of the splints out of the plane of the advancing strips, substantially as described.

22. In a machine for making matches, the combination with means for feeding a series of extended match-strips, of a cutter for dividing said strips into splints of predetermined length, perforated carrier-bars, a staggerer or guide for directing the advancing ends of the strips into two rows of perforations in the carrier-bars, and means for bodily moving the staggerer to cause it to bear upon and deflect the opposite ends of the splints out of the line of movement of the advancing strips, substantially as described.

23. In a match-machine, the combination of a traveling carrier having means for holding match-splints, a splint-cutting knife to cut the strips into splints, a guide for directing the splints into said holders, means for moving said guide in the direction of motion of the carrier and back again, to impart to the rearward ends of the splints a movement in the direction of motion of said carrier, and means for bodily moving said splint-cutting knife to force the splints into such holders, substantially as described.

24. In a match-machine, the combination of a carrier having means for holding match-splints, a splint-cutting knife, a guide for directing the splints longitudinally into said holders, means for moving said guide to impart to the splints a movement in the direction of motion of such carrier, and means for bodily moving said splint-cutting knife to force the splints longitudinally into such holders, substantially as described.

25. In a machine for making matches, the combination with a series of continuously-moving carrier-bars, and means for feeding a series of extended match-strips, of a cutter for dividing the strips into splints, a staggerer for directing the ends of the strips into alternately-disposed perforations in adjacent rows in the carrier-bars, and means for imparting to the cutter an accelerated side movement toward the carrier-bars whereby the splints, when severed from the stock, will be forced into the perforations in the carrier-bars, substantially as described.

26. In a machine for making matches, the combination with a series of continuously-moving carrier-bars, and means for feeding a series of extended match-strips, of a guide through which the strips pass to the carrier-bars, a cutter adapted to cut the strips at predetermined intervals as they issue from said guide, a staggerer for directing adjacent strips alternately to two rows of perforations in the carrier-bars, and means for moving the staggerer to deflect the ends of the splints therein out of the plane of the advancing stock, substantially as described.

27. In a machine for making matches, the combination with a series of continuously-moving carrier-bars, a guide, and means for feeding extended match-strips through the same to the carrier-bars, of a cutter capable of both vertical and side movements, and a movable guide for deflecting the splints out of the plane of the advancing stock and located between the cutter and the carrier-bars, substantially as described.

28. In a match-machine the combination of carrier-bars, and means for feeding match-splints to said bars, of a guide-plate constructed to receive a row of parallel match-splints and properly direct them into several rows of holes in the carrier-bars, each of the guiding-surfaces of which guide-plate has a lateral exit, substantially as and for the purpose described.

29. In a machine, of the kind described, the combination of carrier-bars, and means for feeding match-splints to said bars, of a guide-plate constructed to receive a row of parallel match-splints and properly direct them into several rows of holes in the carrier-bars, the guiding-surfaces of which guide-plate have lateral exits on the same side of the guide-plate, substantially as described.

30. In a match-machine, the combination with a carrier having means for receiving and holding splints in parallel rows, means for feeding splints to said carrier, a guide for the splints on the way to the carrier formed with a plurality of sets of splint-channels, one set extending in a direct line toward the carrier, substantially at right angles to the same, and the other set inclined with reference to the first set so as to guide the splints to a different point in the carrier, and means for moving said guide in the direction of motion of the carrier and back again, substantially as described.

31. In a match-machine, the combination with carrier-bars and means for feeding match-splints to the same, of a guide-plate formed with a plurality of sets of guiding-channels which are inclined to each other and whose receiving ends are in the same plane, and means for moving said guide-plate in the direction of motion of the carrier and back again, substantially as described.

32. In a match-machine, the combination of carrier-bars, means for feeding match-splints to said bars, a guide-plate having a plurality of guiding-channels for the match-splints, and means for oscillating the receiving end of the guide-plate, substantially as and for the purpose described.

33. In a match-machine, the combination with the carrier-bars and the means for feeding match-strips to the same, of a guide-plate supported on trunnions parallel to the carrier-bars and formed with channels or grooves which diverge from its receiving edge to deflect the strips of a single row into two rows of perforations in the carrier-bars, and a rod actuated by a cam and connected with the said guide-plate for oscillating the same, substantially as set forth.

34. In a machine for making matches, the combination of mechanism for feeding extended match-strips, a guide through which said strips pass, a continuously-moving carrier, a movable guide for directing the ends of the strips into perforations therein, and a cutter located between the first-mentioned guide and the movable guide, as set forth.

35. In a machine for making matches, the combination with means for continuously feeding a strip of veneer, of rotary cutter-heads driven at a high speed and adapted to cut the veneer into parallel strips, the cutter-heads being located on opposite sides of and at different points along the veneer, a carrier, a reciprocating means for dividing up the strips into splints of proper length for matches and moving the splints longitudinally to carry their ends into perforations in the carrier, as set forth.

36. In a machine for making matches, the combination with means for continuously feeding a strip of veneer, of rotary cutters driven at a high speed and located on opposite sides of, and at different points along, the veneer and adapted to cut the veneer into parallel strips, a bed-plate opposite each cutter over which the veneer passes, a series of carriers, a reciprocating cutter for dividing up the strips into splints of proper length for matches and moving the splints longitudinally to carry their ends into perforations in the carriers, as set forth.

37. In a match-machine, the combination with devices for depositing matches in boxes, of box-engaging fingers, and means for imparting to said fingers an orbital movement whereby said fingers will be caused to engage with and advance the boxes, substantially as and for the purpose described.

38. In a match-machine, the combination with devices for depositing matches in boxes, of a frame carrying box-engaging fingers, and means for imparting to said frame and fingers an orbital movement, whereby said fingers will be caused to engage with and advance the boxes, substantially as and for the purpose described.

39. In a match-machine, the combination with the devices for depositing matches in boxes, of means for feeding a series of boxes to given points on a table, frames carrying fingers, and means for imparting to said frames an intermittent orbital movement, whereby said fingers will be caused to engage with and advance the boxes to the box-filling mechanism, as set forth.

40. In a match-machine, the combination of an arm carrying box-engaging fingers, a cam, means on said arm for engaging such cam, and means for giving said cam and arm motion with relation to each other, whereby the box-engaging fingers are given an orbital motion to engage with and advance the boxes, substantially as and for the purpose described.

41. In a match-machine, the combination of box-filling mechanism, an arm carrying box-engaging fingers, a path-cam, a projection on said arm for engaging said cam, and means whereby said projection is caused to travel around said cam, whereby said box-engaging fingers are caused to engage and advance said boxes, substantially as and for the purpose described.

42. In a match-machine, the combination of box-filling mechanism, box-engaging fingers, an arm carrying said fingers and having a projection thereon, a part having an internal cam-surface, a spring-pressed switch within the space inclosed by the cam-surface, and a sleeve for guiding such arm and causing its projection to travel around the cam-surface, thus giving said fingers a motion to engage and advance the boxes, substantially as and for the purpose described.

43. In a match-machine, the combination of box-filling mechanism, box-engaging fingers, an arm carrying said fingers and having a projection thereon, a part having an internal cam-surface, a spring-pressed switch within the space inclosed by the cam-surface, an oscillating sleeve for guiding such arm and causing its projection to travel around the cam-surface, thus giving said fingers a motion to engage and advance the boxes, and a spring tending to force said projection on the arm toward the wall of the cam where the switch is placed, substantially as and for the purpose described.

44. In a match-machine, the combination with the devices for carrying and discharging the matches, a chute through which the matches drop into boxes, and a series of reciprocating troughs for receiving the matches as they are detached from the carriers and depositing them in the chute, of a series of guide-plates extending between the reciprocating troughs through the chute and into the boxes beneath the same, and means for raising the said plates to permit the removal and substitution of boxes, as set forth.

45. In a match-machine, the combination with devices for depositing matches in boxes, of box-feeding mechanism, and a tripping device controlling the action of the box-feeding mechanism and dependent for operation upon the accumulation of a predetermined quantity of matches in the boxes, substantially as and for the purpose described.

46. In a match-machine, the combination with devices for depositing matches in boxes, of box-removing mechanism, and a tripping device controlling the action of the box-removing mechanism and dependent for operation upon the accumulation of a predetermined quantity of matches in the boxes, substantially as and for the purpose described.

47. In a match-machine, the combination with devices for depositing matches in boxes, of box-feeding mechanism, a tripping device controlling the same and dependent for operation upon the accumulation of a predetermined quantity of matches in the boxes, and supports for receiving the filled boxes and depositing them on a conveyer, substantially as and for the purpose described.

48. In a match-machine, the combination of box-filling mechanism, box-feeding devices, box-removing devices, trip mechanism by which the box-feeding devices are caused to deliver the filled box to the box-removing devices, said trip mechanism being dependent for operation upon the accumulation of a predetermined quantity of matches in the boxes, and mechanism which is operated at regular intervals and which gives the feeding movement to the box-feeding devices, substantially as and for the purpose described.

49. In a match-machine, the combination with the devices for depositing matches in boxes, of box-feeding mechanism, an automatic tripping device controlling the same and dependent for operation upon the accumulation of a predetermined quantity of matches in the boxes, and supports for receiving the filled boxes and depositing them on a conveyer, and adapted to go through their cycle of movement at regular intervals, as set forth.

50. In a match-machine, the combination with the devices for depositing the matches into boxes, of a reciprocating plunger entering the boxes at intervals, a tripping device operated by the plunger, when the boxes are filled to a predetermined level, and box-feed mechanism controlled in its operation by said tripping device, as set forth.

51. In a match-machine, the combination with the devices which carry and discharge the matches and a reciprocating conveyer for receiving charges of matches and transferring them to boxes, of a reciprocating plunger adapted to descend into the boxes at intervals while they are being filled, and a tripping mechanism set in operation by the stoppage of the plunger when the boxes are filled to a predetermined level, as set forth.

52. In a machine for making matches, the combination with a series of continuously and uniformly moving carrier-bars, of ejector-pins for detaching matches from the bars, a support for said pins, and means for reciprocating in a rectilinear path and at the same time oscillating the said support as set forth.

53. In a machine for making matches, the combination with a series of continuously-moving carrier-bars, of a frame supporting a plate, pins set in said plate, a cam for reciprocating the frame in a rectilinear path toward and away from the carrier-bars, and a cam for oscillating the frame, whereby the pins will be caused to eject the matches from perforations in the carrier-bars, and at the same time move with the bars, as set forth.

54. In a match-machine, the combination with a series of continuously-moving match-carrying plates, a frame, the forward end of which carries a series of ejector-pins, a second frame capable of oscillation and supporting the first frame, means for reciprocating the first frame in a rectilinear path and means for oscillating the second frame, substantially as and for the purpose described.

55. In a match-machine, the combination with a series of continuously-moving match-carrying plates, a frame, the forward end of which carries a series of ejector-pins, a second frame mounted within the first so as to be capable of oscillation, and supporting by a sliding connection the forward end of the outer frame, a rotary shaft, a cam thereon which oscillates the inner frame, and other cams which reciprocate the outer frame in a rectilinear path, as set forth.

56. In a match-machine, the combination with the devices for depositing matches in boxes, of a traveling belt and supports for transferring the boxes from the positions in which they receive the matches and depositing them on the belt by a motion in the direction of movement of said belt, and means for imparting to said supports an accelerated motion, as and for the purpose set forth.

57. In a match-machine, the combination with the devices for depositing matches into boxes, of a conveyer, and supports for transferring the boxes from the positions in which they receive the matches and depositing them on the conveyer, the said supports being movable for such purpose through the arc of a circle, the latter end of said movement being substantially tangent to the line of movement of the conveyer, and means for imparting to said supports an accelerated motion, as and for the purpose set forth.

58. In a match-machine, the combination of one or more rock-shafts, box-holding fingers supported from sleeves splined on said shafts, springs tending to move said sleeves relative to each other, cams on said sleeves, cams with which said cams on the sleeves coact to cause the box-holding fingers to move in opposition to said springs, and means for changing the relative location of the two sets of cams, whereby the box-holding fingers are opened and closed as the shaft is rocked, substantially as and for the purpose described.

GEO. A. BARNES.

Witnesses:
M. LAWSON DYER,
PARKER W. PAGE.